(12) United States Patent
Spiro

(10) Patent No.: US 11,778,955 B2
(45) Date of Patent: Oct. 10, 2023

(54) AUTOMATED VERTICAL PLANT CULTIVATION SYSTEM

(71) Applicant: URBAN PLANTER LLC, Scottsdale, AZ (US)

(72) Inventor: Daniel S. Spiro, Scottsdale, AZ (US)

(73) Assignee: URBAN PLANTER, LLC, Scottsdale, AZ (US)

( * ) Notice: Subject to any disclaimer, the term of this patent is extended or adjusted under 35 U.S.C. 154(b) by 766 days.

(21) Appl. No.: 16/805,093

(22) Filed: Feb. 28, 2020

(65) Prior Publication Data

US 2020/0196534 A1   Jun. 25, 2020
US 2022/0039327 A9   Feb. 10, 2022

Related U.S. Application Data

(63) Continuation-in-part of application No. 16/202,821, filed on Nov. 28, 2018, now Pat. No. 11,122,748.
(Continued)

(51) Int. Cl.
*A01G 9/02* (2018.01)
*A01G 27/00* (2006.01)
*A01M 21/04* (2006.01)

(52) U.S. Cl.
CPC .......... *A01G 9/023* (2013.01); *A01G 27/005* (2013.01); *A01M 21/043* (2013.01)

(58) Field of Classification Search
CPC .... A01G 9/023; A01G 27/005; A01M 21/043
See application file for complete search history.

(56) References Cited

U.S. PATENT DOCUMENTS 1,560,436 A   11/1925   Staples
1,974,068 A   9/1934   Greensaft
(Continued)

FOREIGN PATENT DOCUMENTS

CA   2859165   6/2013
CN   103416292   12/2013
(Continued)

OTHER PUBLICATIONS

Translation of "Aerial Garden"; Park Ki Hong;KR-20100032630-A (Year: 2010).*
(Continued)

*Primary Examiner* — Monica L Perry
*Assistant Examiner* — Brittany A Lowery
(74) *Attorney, Agent, or Firm* — XSENSUS LLP

(57) ABSTRACT

An automated outdoor modular vertical plant cultivation system forming a vertical structure is provided. The system includes a plurality of shelves, each shelf having a web and flanges; two posts, each post having a web and flanges. Each shelf of the plurality of shelves is mounted between the two posts with incremental spacing between each adjacent shelf along a vertical length of the two posts. The web of each shelf includes a plurality of openings for retaining planter vessels. The flanges of each shelf retain an embedded structural member. The system includes a fluid circulatory system including shelf irrigation piping extending longitudinally above the web of each shelf; and power or power and data and fluid members for the system distributed from vertical risers located in proximity to the web of the posts, wherein the flanges of the shelves have provisions to retain the fluid circulatory system.

12 Claims, 23 Drawing Sheets

Related U.S. Application Data

(60) Provisional application No. 62/592,246, filed on Nov. 29, 2017.

(56) References Cited

U.S. PATENT DOCUMENTS

| | | | |
|---|---|---|---|
| 2,279,735 A * | 4/1942 | Gates | A01G 9/025 47/33 |
| 2,723,341 A | 11/1955 | Greenspan | |
| 3,030,735 A | 4/1962 | Bodkins | |
| 3,314,192 A | 4/1967 | Park | |
| 3,950,637 A | 4/1976 | Rodin | |
| D243,906 S | 4/1977 | Ware | |
| 4,170,844 A | 10/1979 | Steele | |
| 4,295,296 A | 10/1981 | Kinghom | |
| 4,626,968 A | 12/1986 | Von Kohorn | |
| 4,845,602 A | 7/1989 | Lehocki | |
| 5,454,187 A | 10/1995 | Wasserman | |
| 5,524,387 A | 6/1996 | Whisenant | |
| 5,826,375 A | 10/1998 | Black | |
| 6,061,957 A | 5/2000 | Takashima | |
| 6,105,309 A | 8/2000 | Takayanagi | |
| 6,134,832 A | 10/2000 | Bokmiller et al. | |
| 6,536,159 B1 | 3/2003 | Van Den Ende | |
| 7,997,429 B2 | 8/2011 | Anker | |
| 8,549,788 B2 | 10/2013 | Bryan, III | |
| 8,864,331 B2 | 10/2014 | Kalb | |
| 9,462,755 B1 * | 10/2016 | Coraggio | A01G 9/025 |
| 9,775,330 B1 | 10/2017 | Chen | |
| 9,974,252 B2 | 5/2018 | Aykroyd et al. | |
| 10,136,587 B1 * | 11/2018 | Johnson | A01G 25/165 |
| 2003/0145519 A1 | 8/2003 | Winsbury | |
| 2004/0110279 A1 | 6/2004 | Everett | |
| 2007/0104841 A1 | 5/2007 | Min | |
| 2007/0199241 A1 | 8/2007 | Peleszezak | |
| 2008/0092442 A1 | 4/2008 | Singer | |
| 2008/0222949 A1 | 9/2008 | Bissonnette | |
| 2008/0251483 A1 | 10/2008 | Davis | |
| 2010/0037517 A1 | 2/2010 | Copping et al. | |
| 2010/0141156 A1 | 6/2010 | Canino et al. | |
| 2010/0146854 A1 | 6/2010 | Cannon | |
| 2011/0000807 A1 | 1/2011 | Snelten | |
| 2011/0219689 A1 | 9/2011 | Hodson-Walker | |
| 2011/0258927 A1 | 10/2011 | Carter | |
| 2012/0019382 A1 | 1/2012 | Kohler et al. | |
| 2012/0054061 A1 | 3/2012 | Fok | |
| 2012/0144740 A1 | 6/2012 | Igarashi | |
| 2012/0260569 A1 | 10/2012 | Golgotiu | |
| 2013/0074408 A1 | 3/2013 | Singh | |
| 2013/0255146 A1 | 10/2013 | Lehman | |
| 2013/0294065 A1 | 11/2013 | Wells | |
| 2013/0298461 A1 | 11/2013 | Shih | |
| 2014/0000162 A1 | 1/2014 | Blank | |
| 2014/0026482 A1 | 1/2014 | Nell | |
| 2014/0083004 A1 * | 3/2014 | Mackenzie | A01G 9/025 47/66.6 |
| 2014/0115958 A1 | 5/2014 | Helene | |
| 2014/0208642 A1 | 7/2014 | Henman et al. | |
| 2014/0230326 A1 | 8/2014 | Wilson et al. | |
| 2014/0318012 A1 | 10/2014 | Fujiyama | |
| 2015/0000191 A1 | 1/2015 | Nagadome | |
| 2015/0223402 A1 | 8/2015 | Krijn | |
| 2015/0223418 A1 | 8/2015 | Collins et al. | |
| 2015/0230409 A1 | 8/2015 | Nicole | |
| 2015/0237811 A1 | 8/2015 | Marquez | |
| 2016/0014974 A1 | 1/2016 | Grajcar | |
| 2016/0037737 A1 | 2/2016 | Fingerle | |
| 2016/0128288 A1 | 5/2016 | Pettinelli | |
| 2016/0135395 A1 | 5/2016 | Umpstead | |
| 2016/0192606 A1 | 7/2016 | Karbowski | |
| 2016/0205739 A1 | 7/2016 | Grajcar | |
| 2016/0316645 A1 | 11/2016 | Neufeld | |
| 2016/0316646 A1 | 11/2016 | Lepp | |
| 2016/0345518 A1 | 12/2016 | Collier | |
| 2016/0360712 A1 | 12/2016 | Yorio | |
| 2017/0006788 A1 * | 1/2017 | Hashimoto | A01G 9/0295 |
| 2017/0071143 A1 | 3/2017 | Newsam | |
| 2017/0079223 A1 | 3/2017 | Cheng | |
| 2017/0105372 A1 | 4/2017 | Bryan, III | |
| 2017/0202156 A1 | 7/2017 | Harms | |
| 2017/0202164 A1 | 7/2017 | Dufresne | |
| 2017/0223910 A1 | 8/2017 | Grossman | |
| 2018/0042191 A1 | 2/2018 | Blackburn | |
| 2018/0042192 A1 | 2/2018 | Volpe | |
| 2018/0077884 A1 | 3/2018 | Barker | |
| 2018/0103599 A1 | 4/2018 | Zhan | |
| 2018/0168108 A1 | 6/2018 | Foreman | |
| 2019/0246584 A1 | 8/2019 | Hsueh | |

FOREIGN PATENT DOCUMENTS

| | | |
|---|---|---|
| CN | 104584924 | 5/2015 |
| FR | 2322573 | 1/1977 |
| GB | 201715204 | 11/2017 |
| JP | 2016539662 | 12/2016 |
| KR | 20120015684 | 2/2012 |
| KR | 20120042304 | 5/2012 |
| WO | WO 2015/072076 | 5/2015 |
| WO | 2015140493 | 9/2015 |
| WO | 2016027409 | 2/2016 |
| WO | 2017024353 | 2/2017 |

OTHER PUBLICATIONS

Translation of "Plant Port for Supporting Hanger"; 남순녀; KR-20150003480-U (Year: 2015).*
Non-Final Office Action in U.S. Appl. No. 16/672,160 dated Nov. 17, 2021 (37 pages).
Spiro, Daniel S., Automated Vertical Plant Cultivation System, Patent Cooperation Treaty Application Serial No. PCT/US18/31429, filed May 7, 2018, International Search Report and Written Opinion dated Sep. 24, 2018.

* cited by examiner

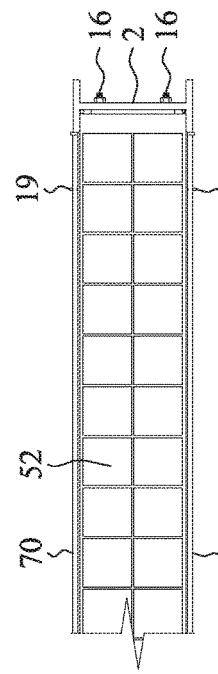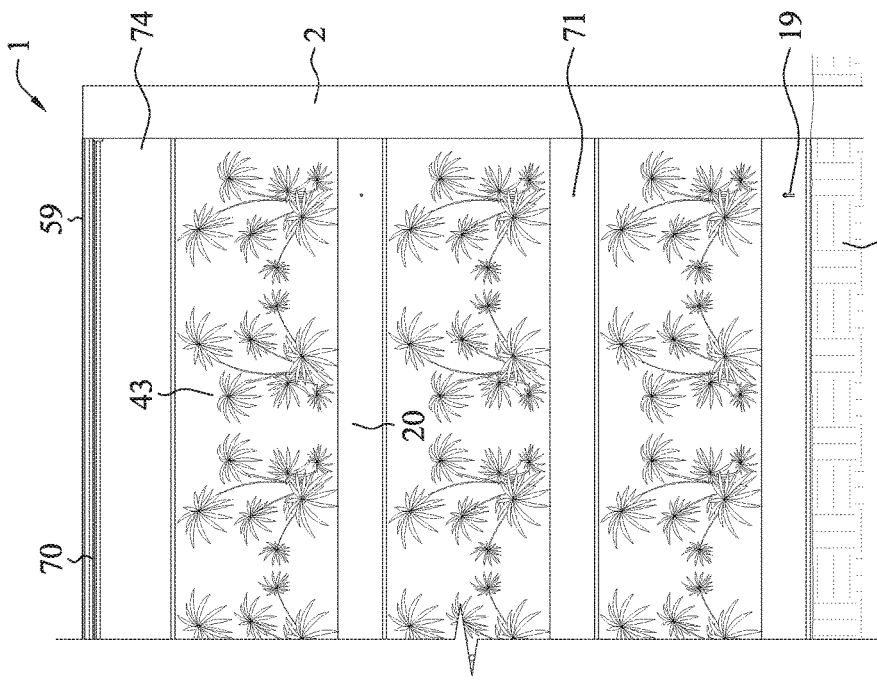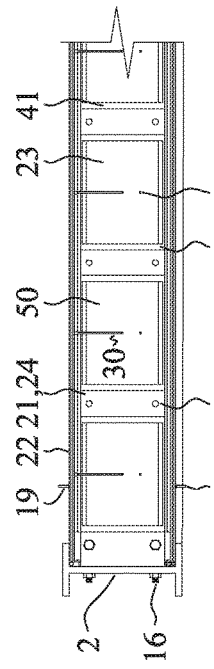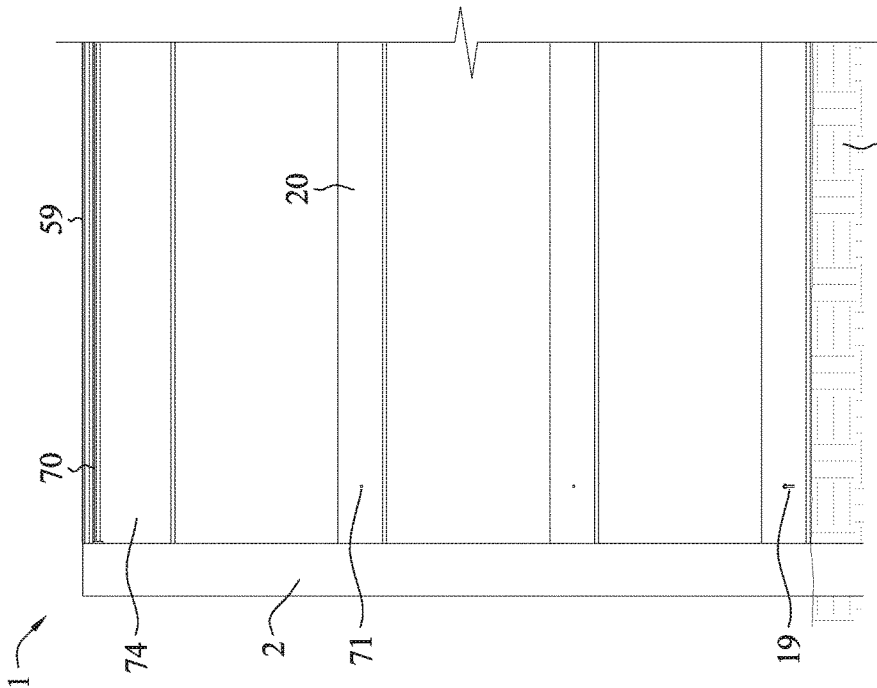

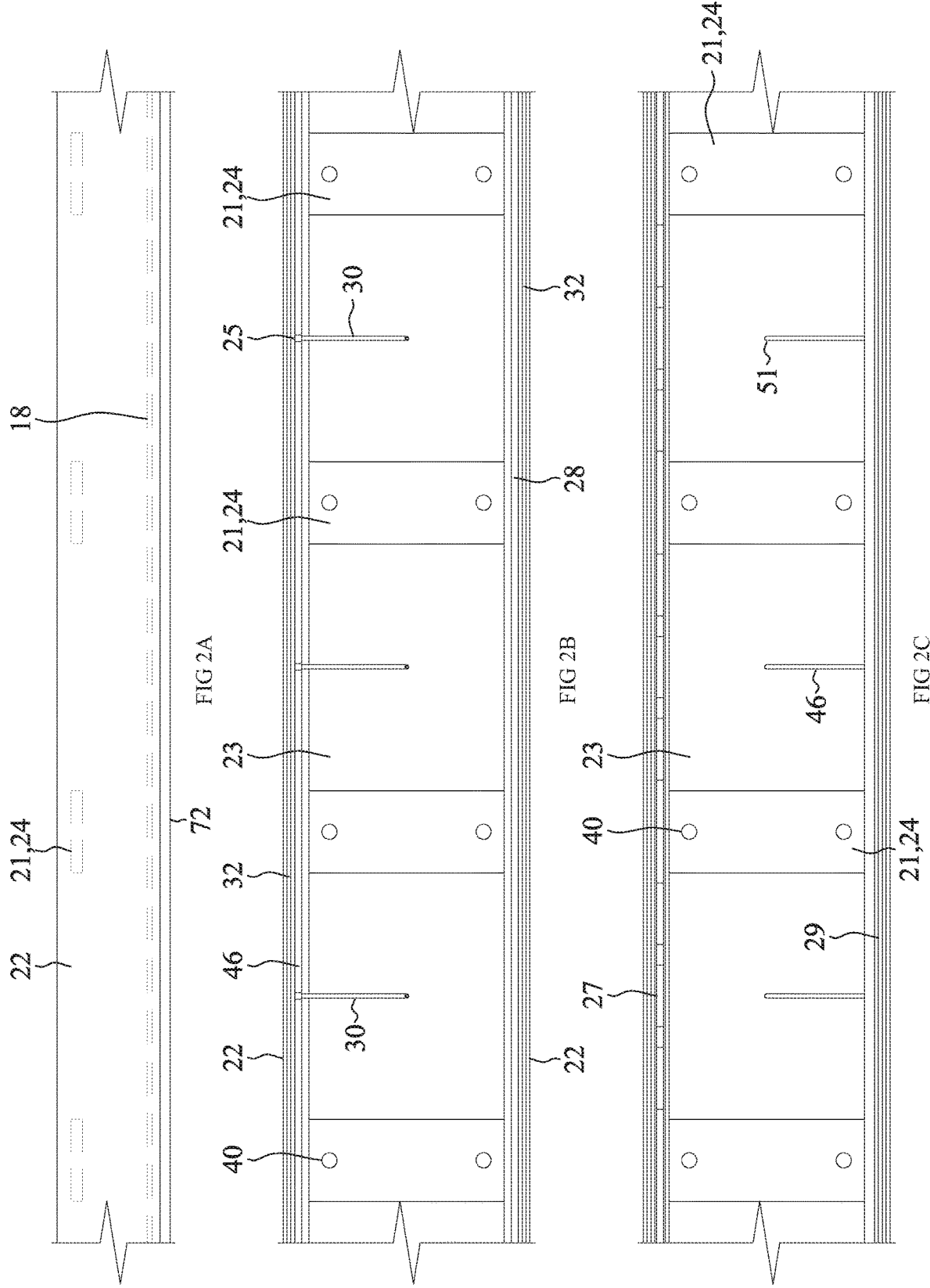

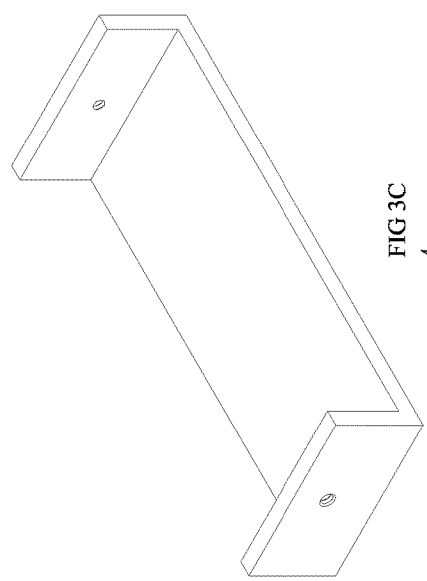
FIG 3A
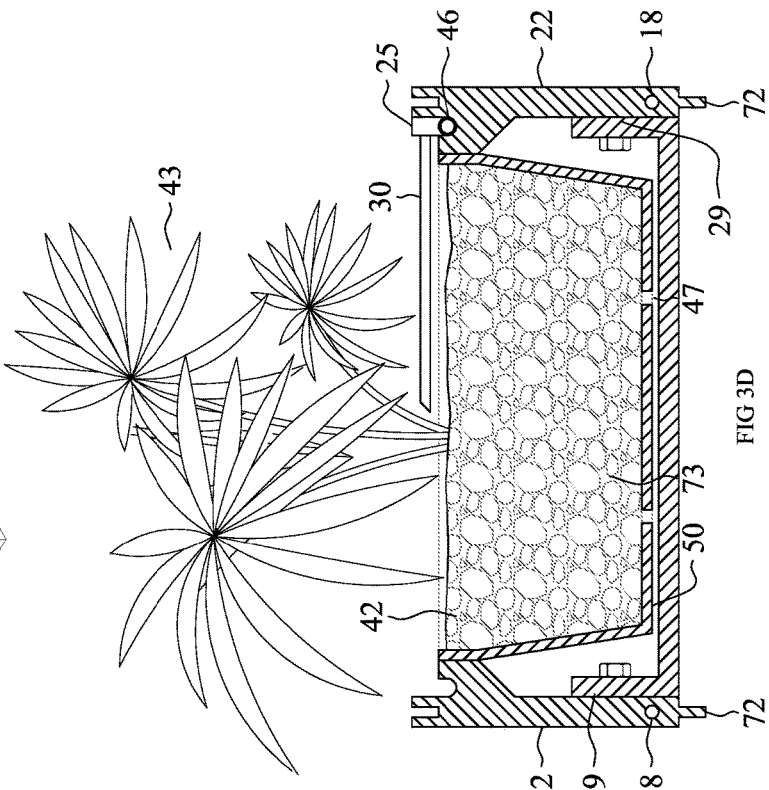
FIG 3C
FIG 3D
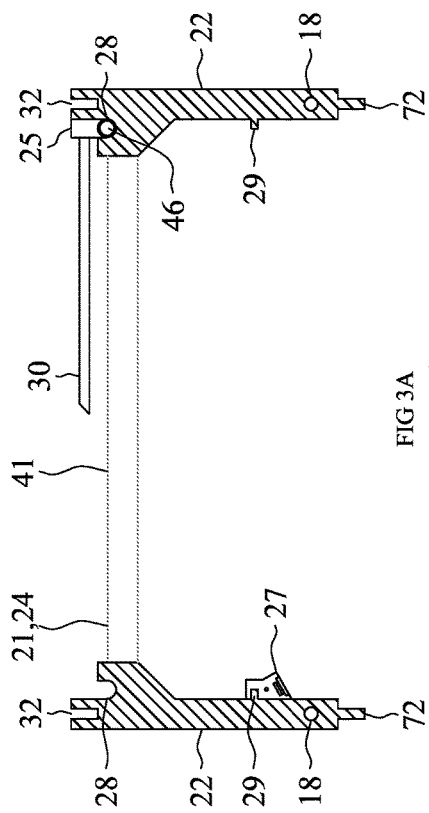
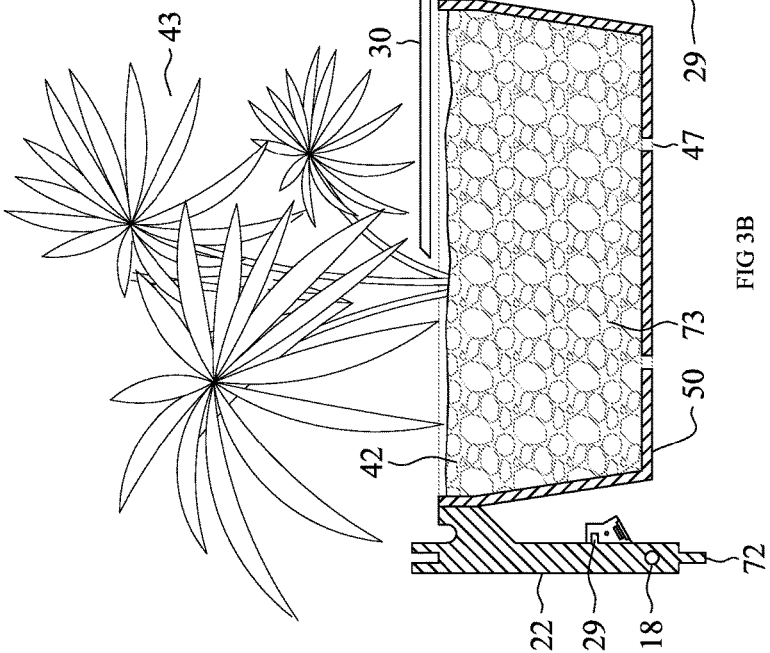
FIG 3B

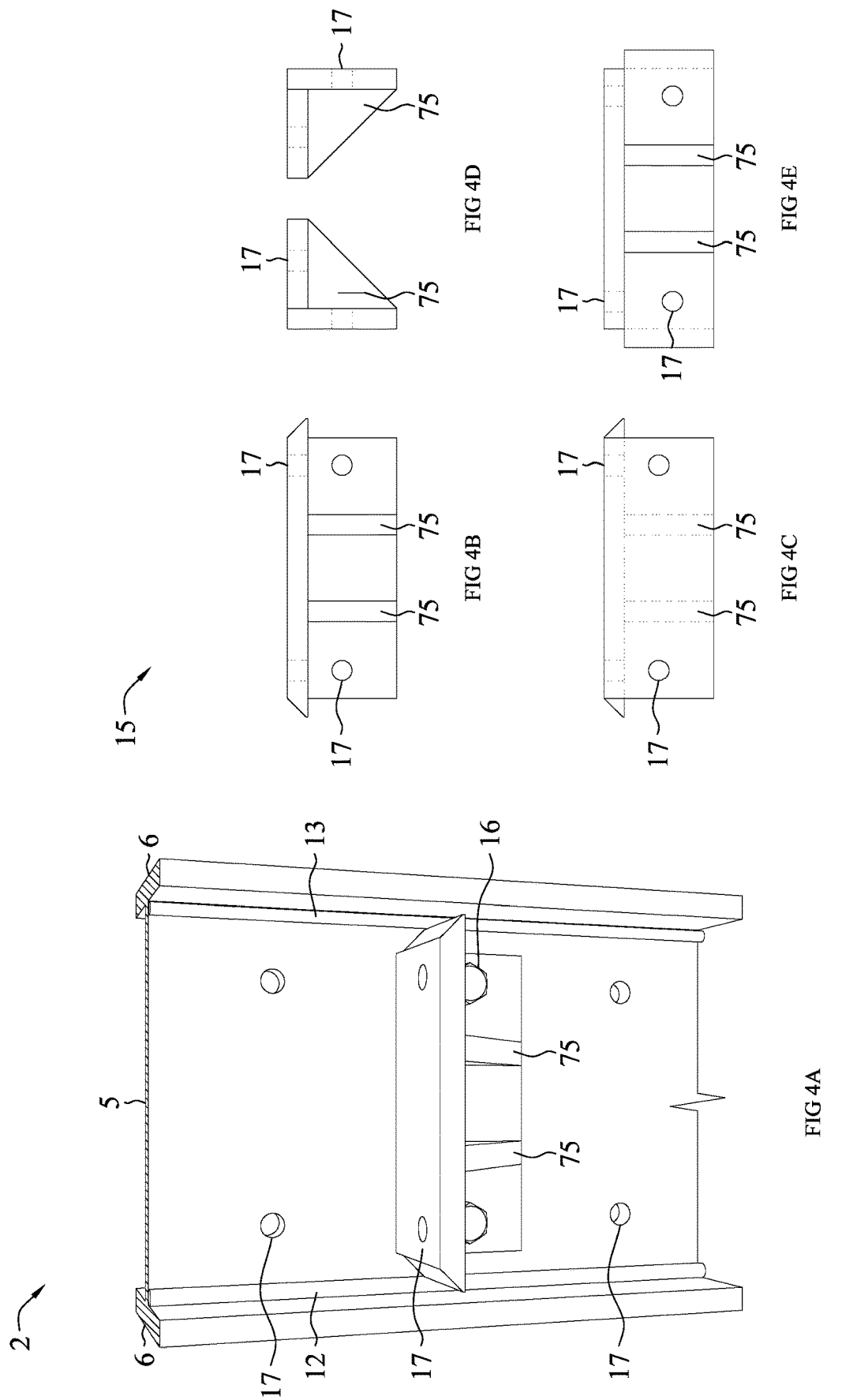

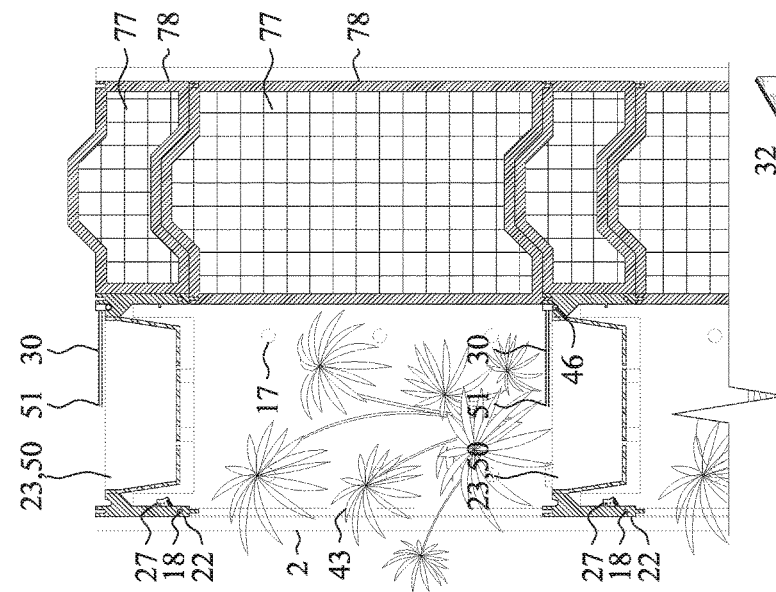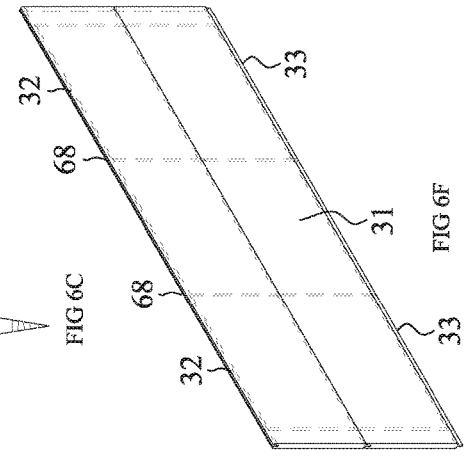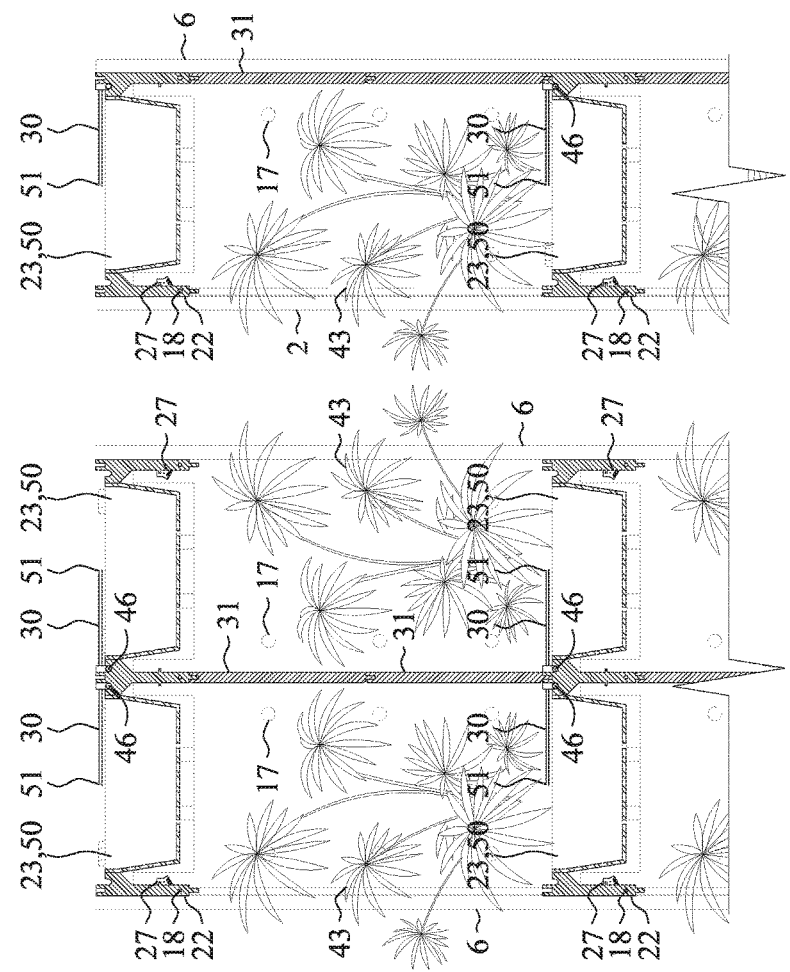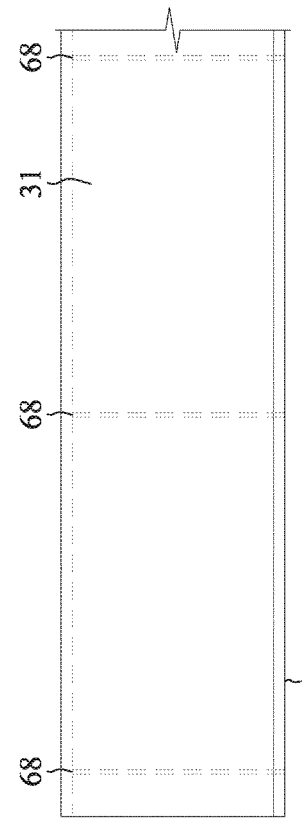

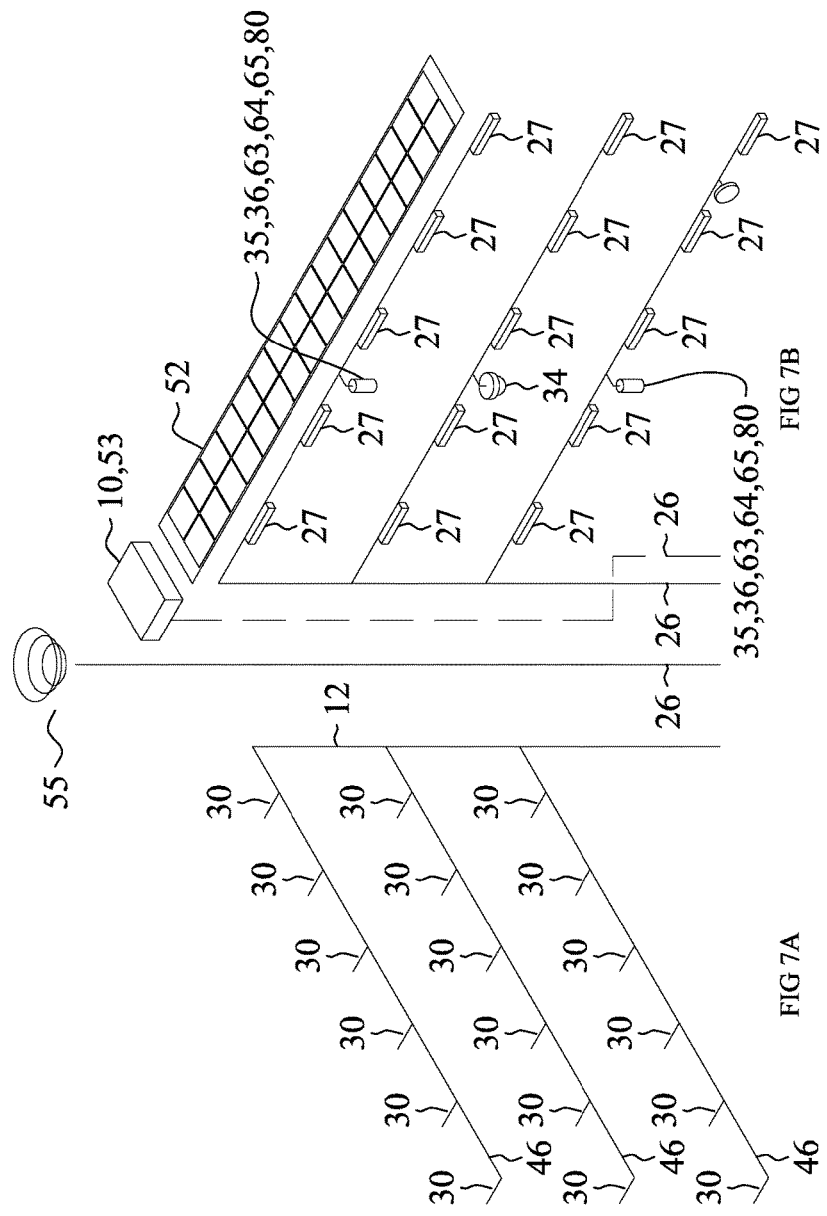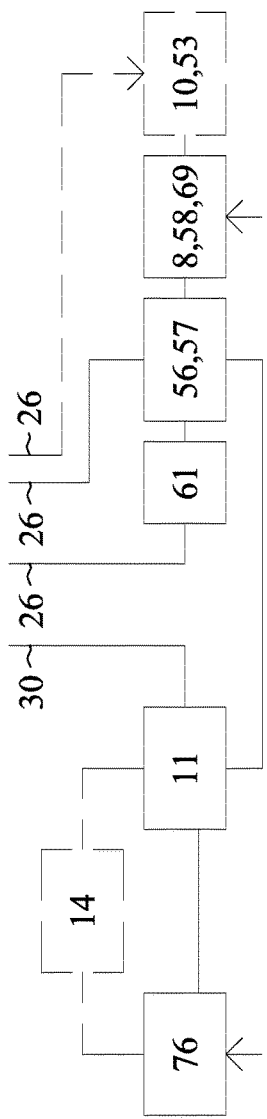

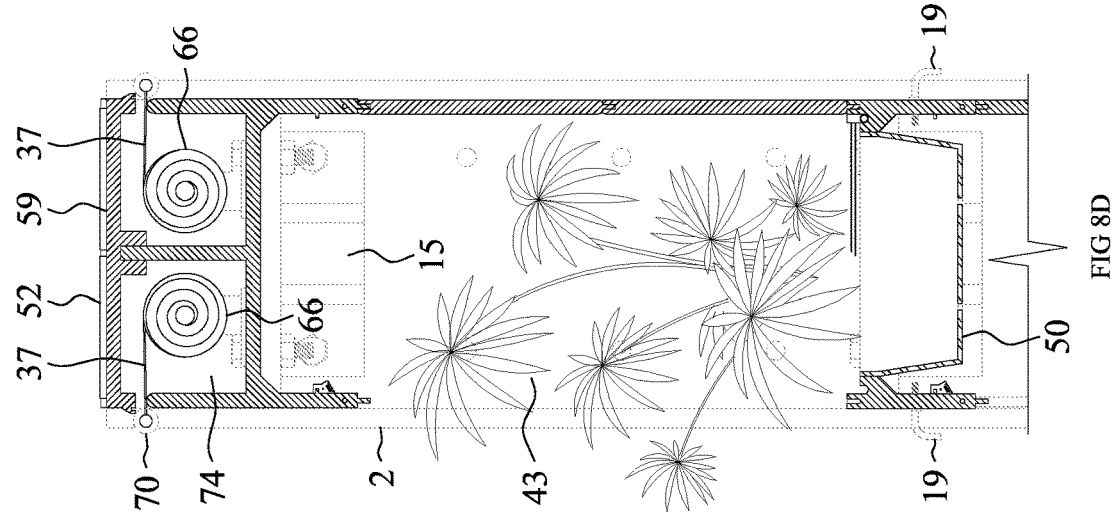
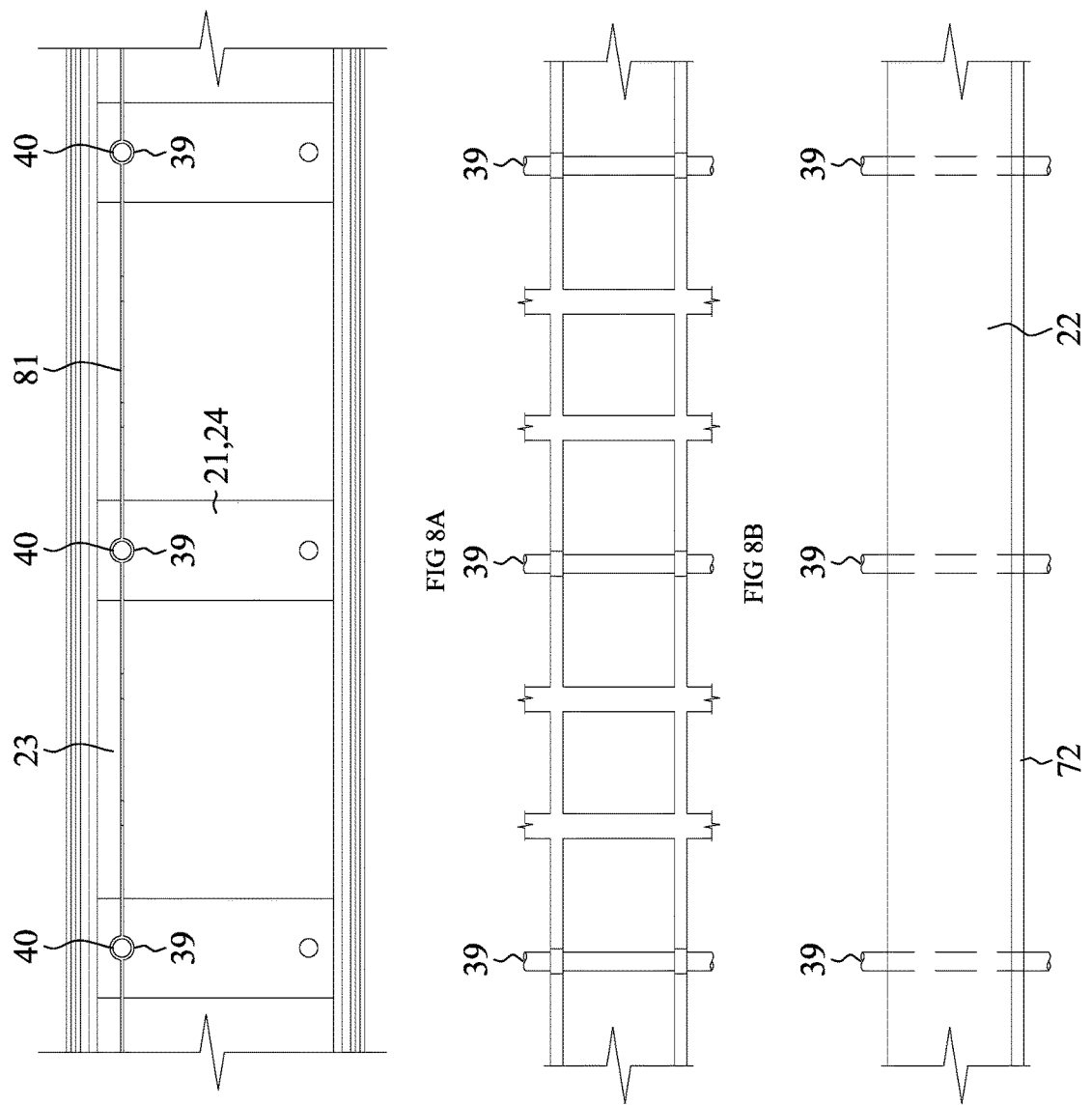

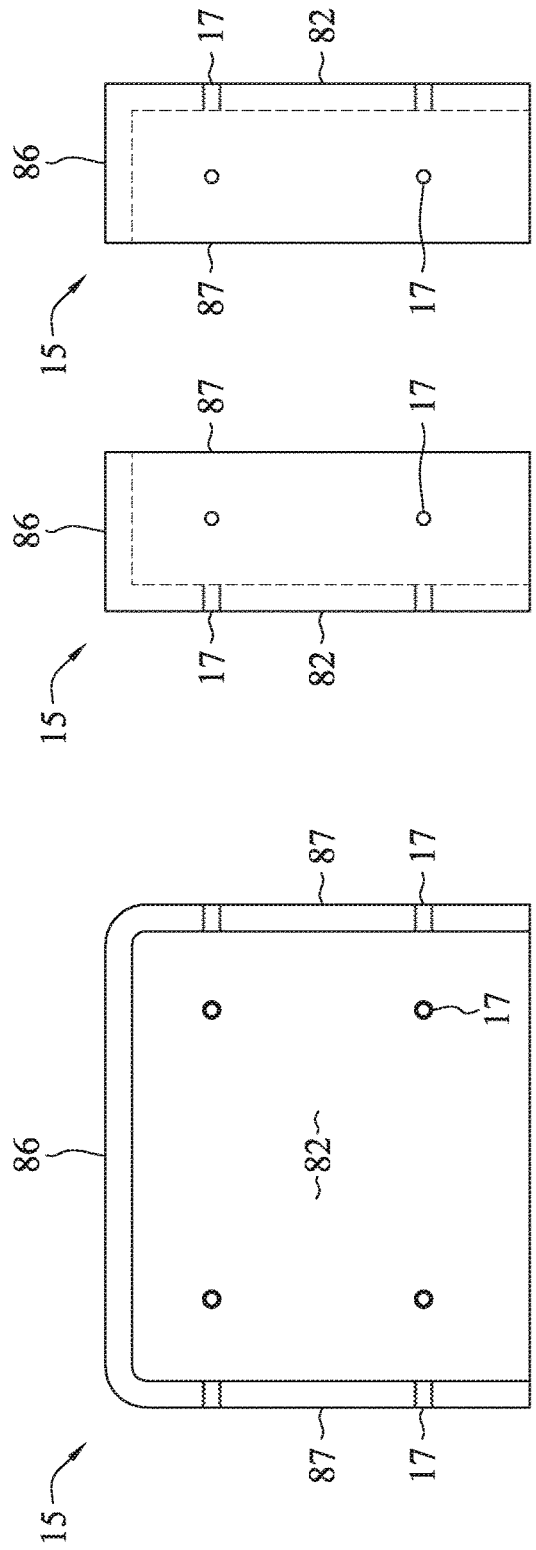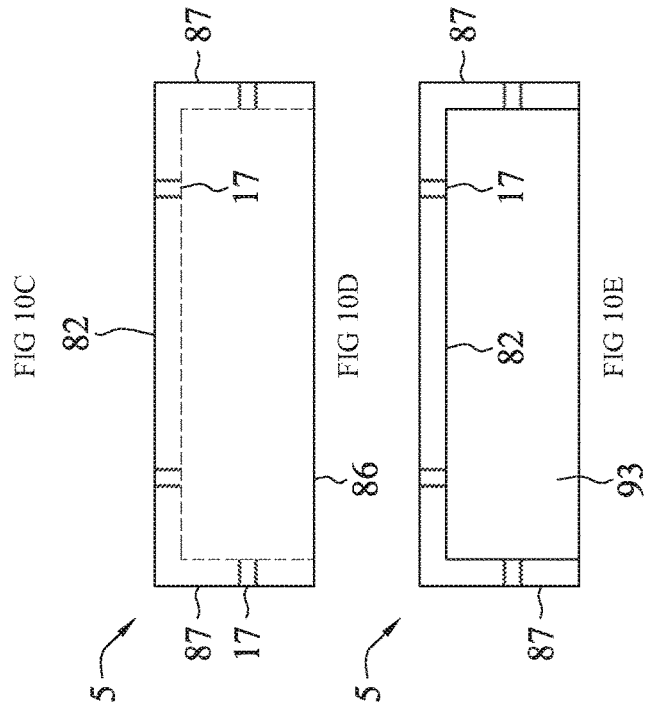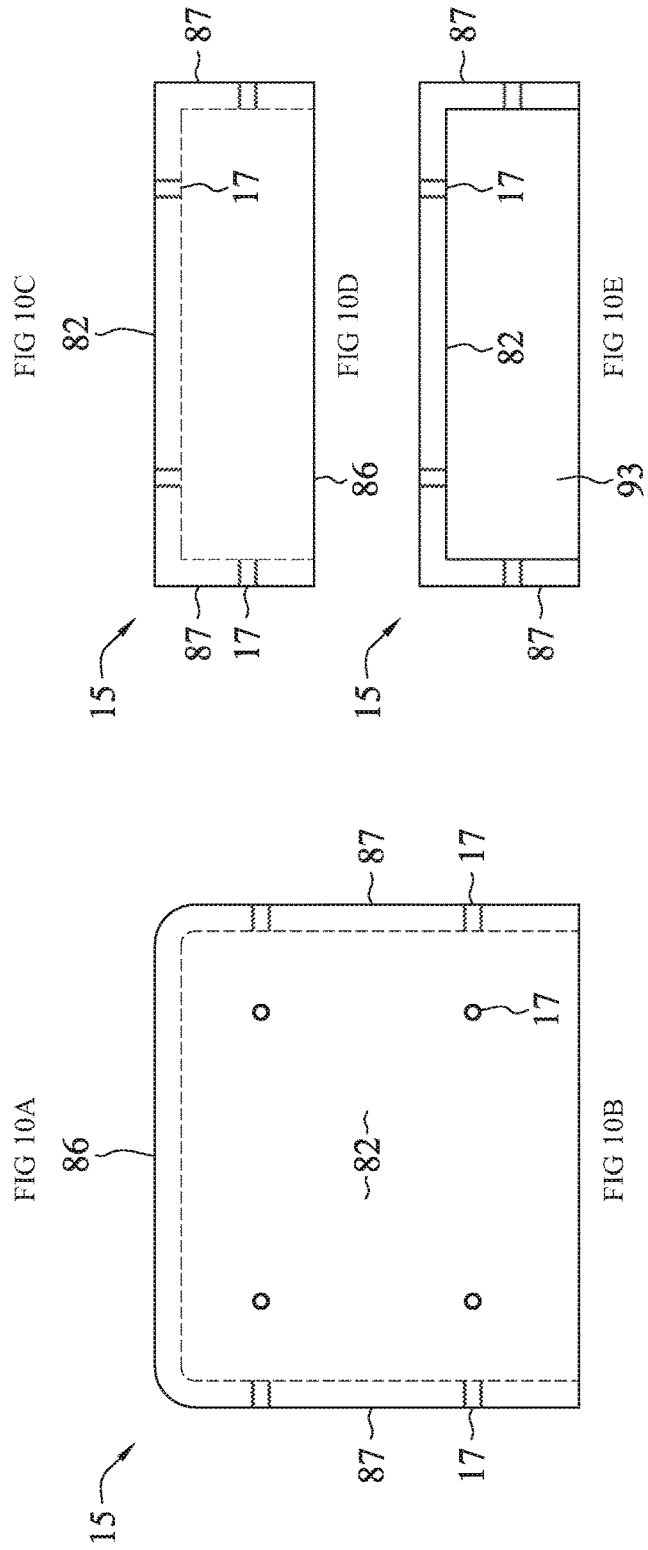

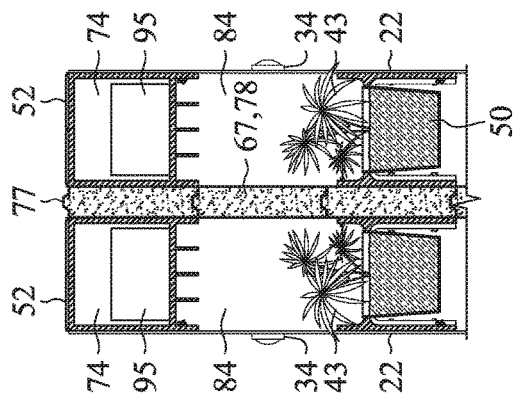
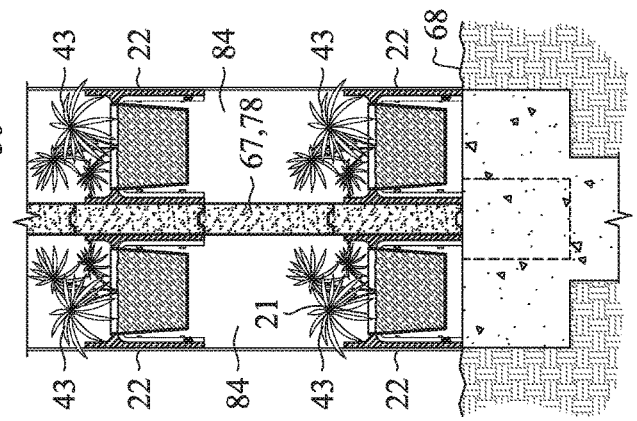
FIG 13C
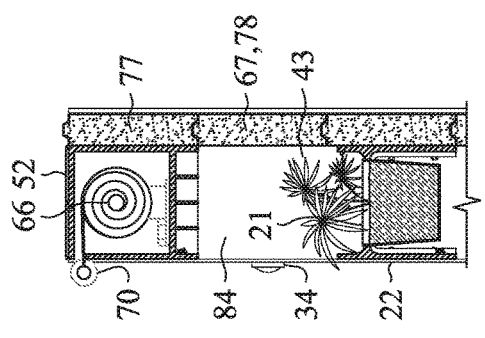
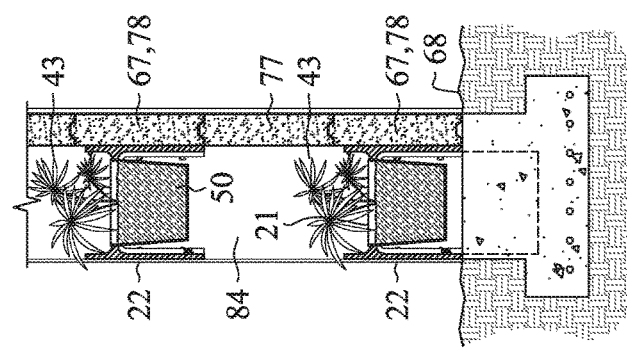
FIG 13B
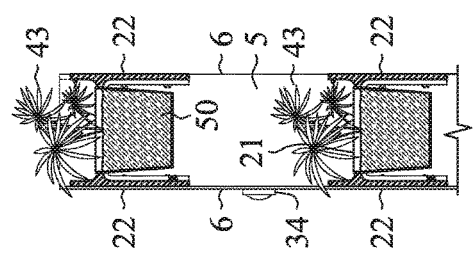
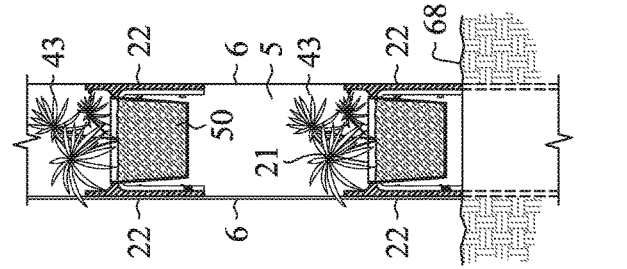
FIG 13A

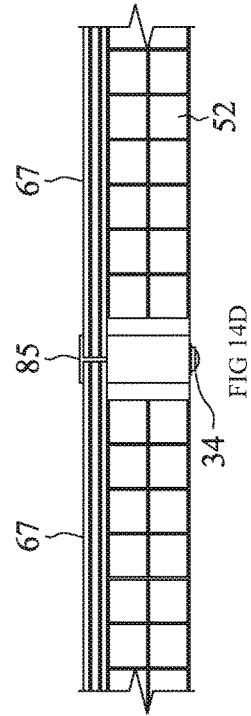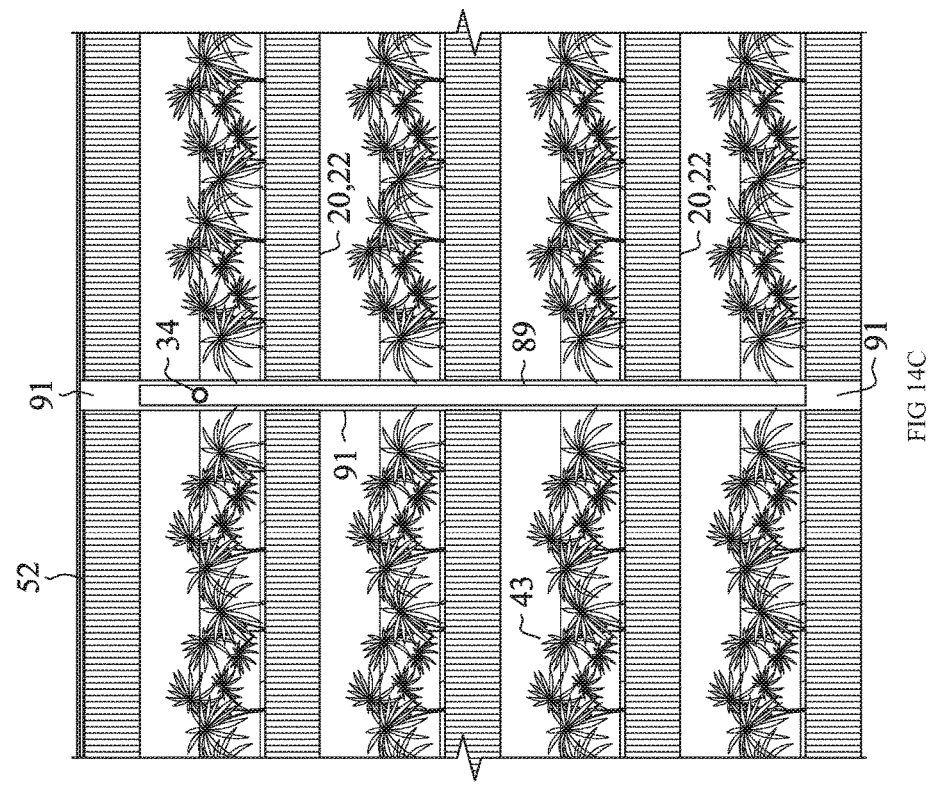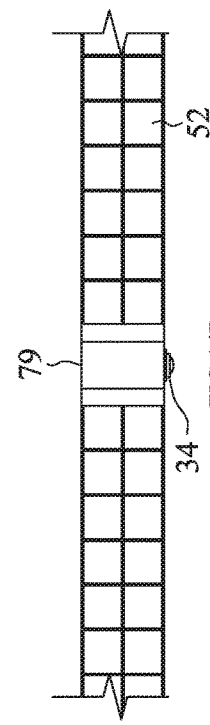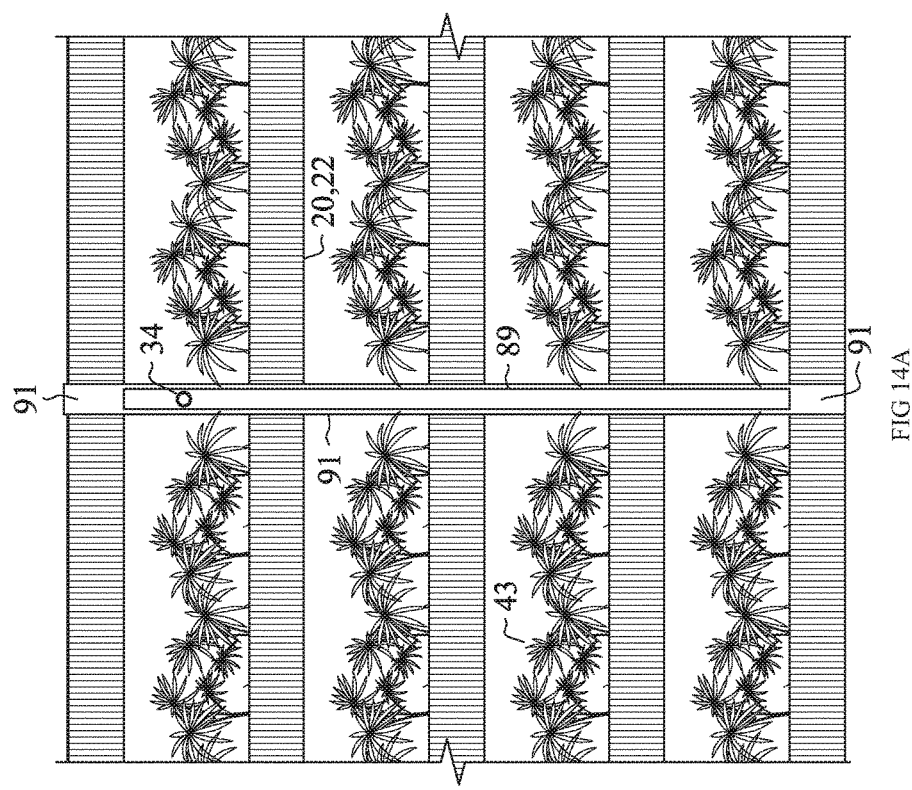

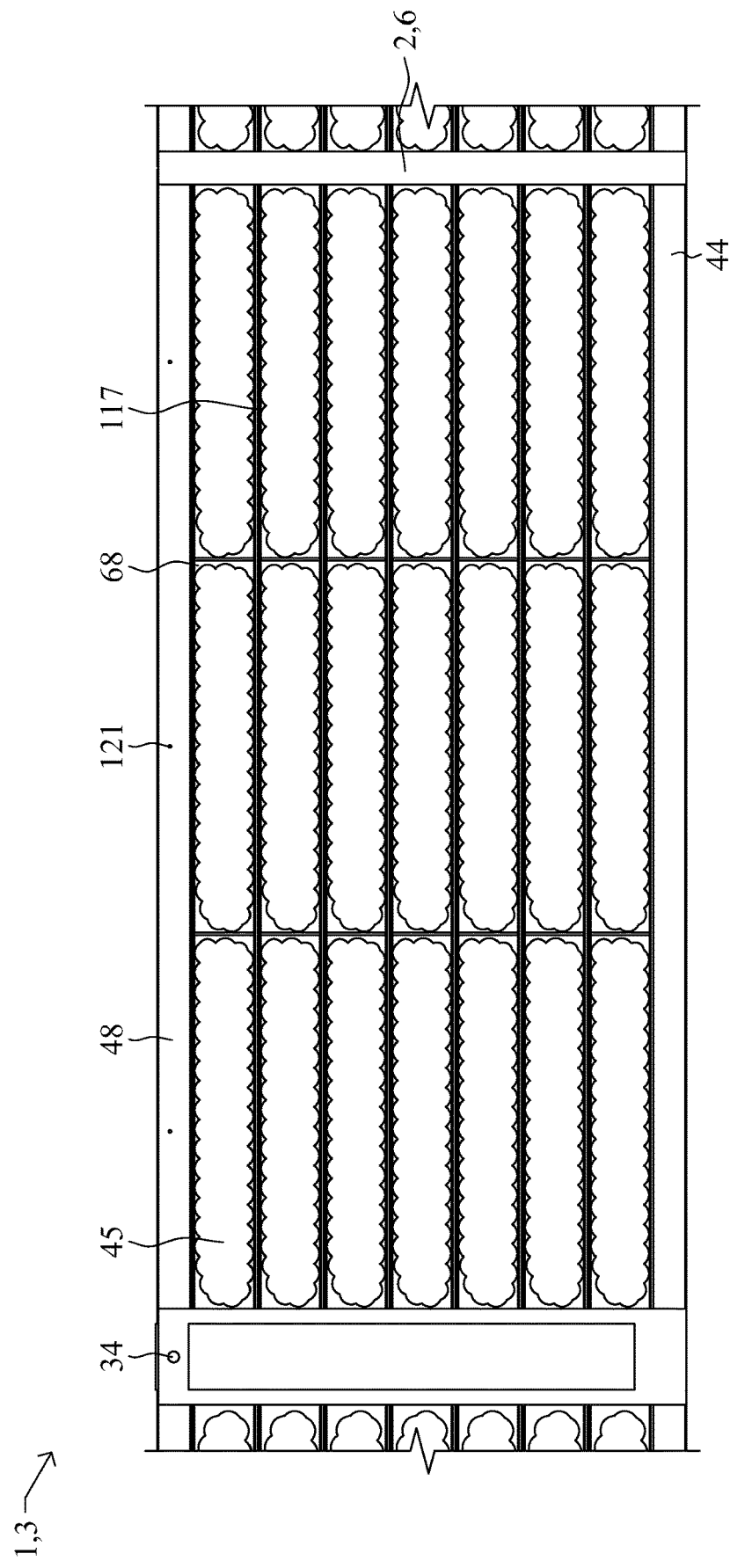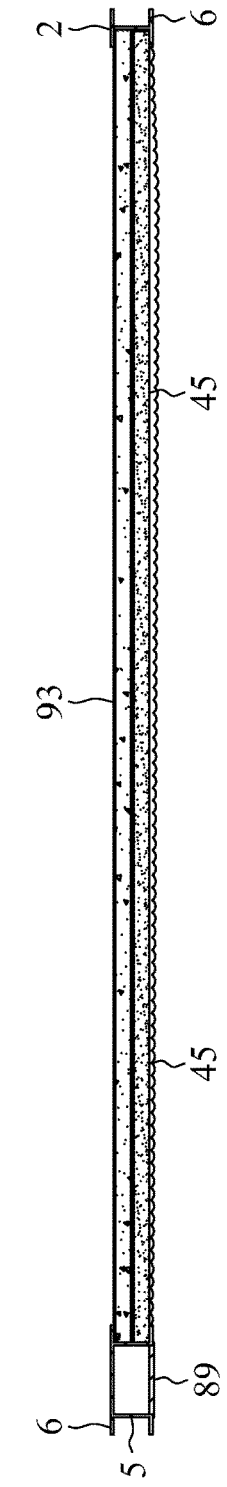
FIG 15A
FIG 15B

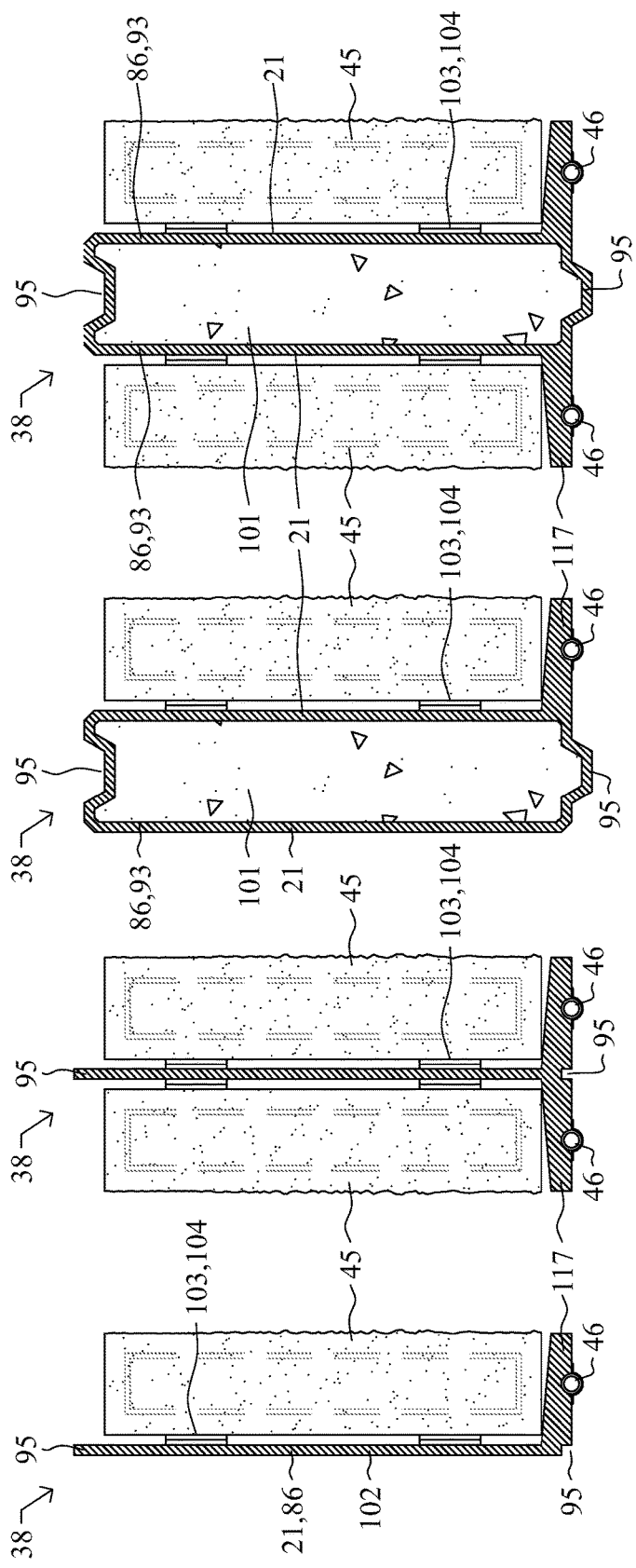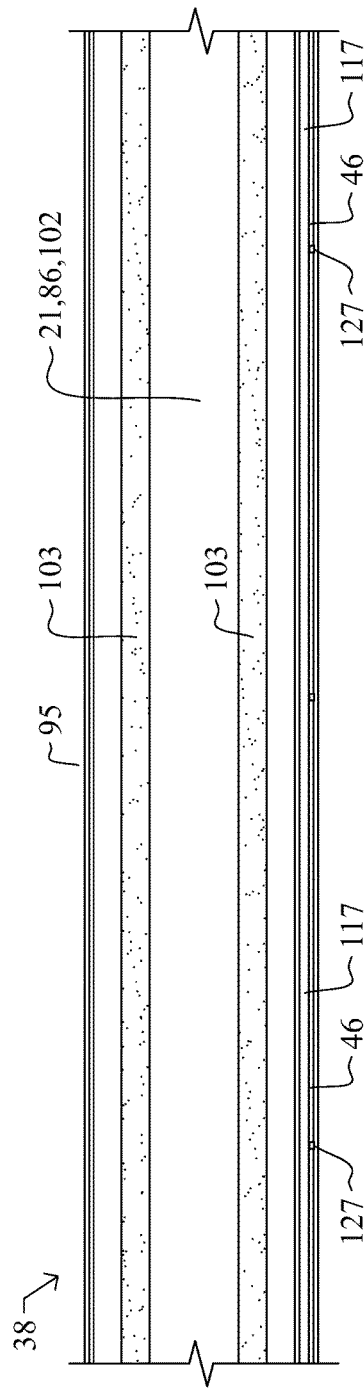

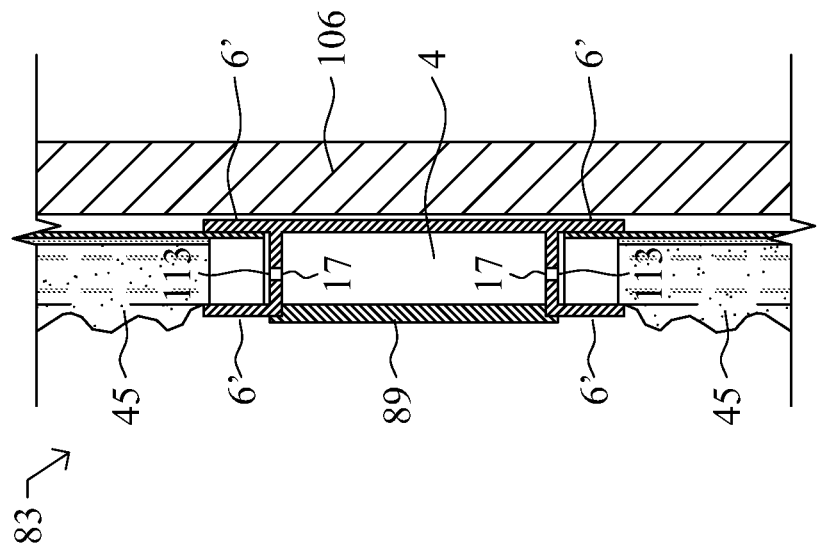
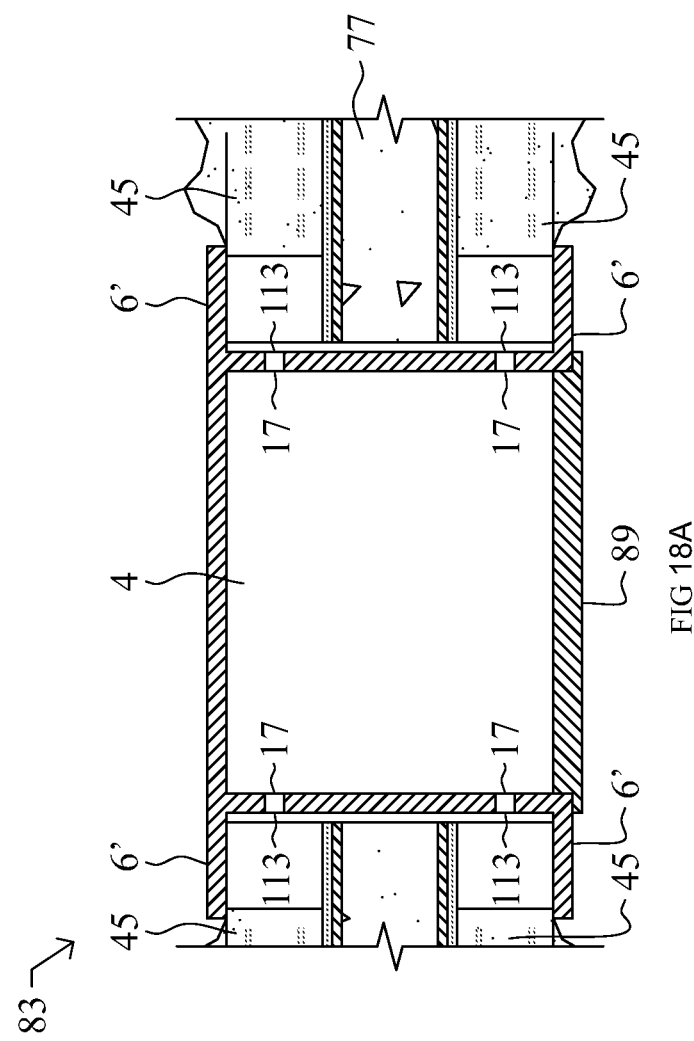

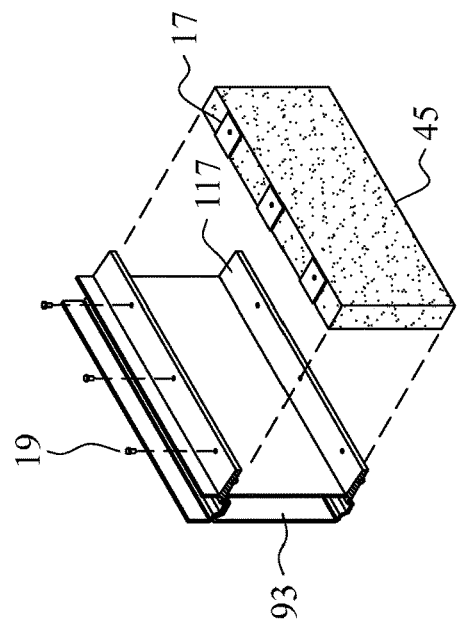
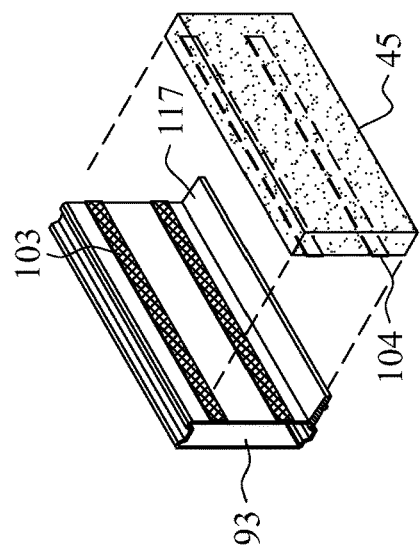
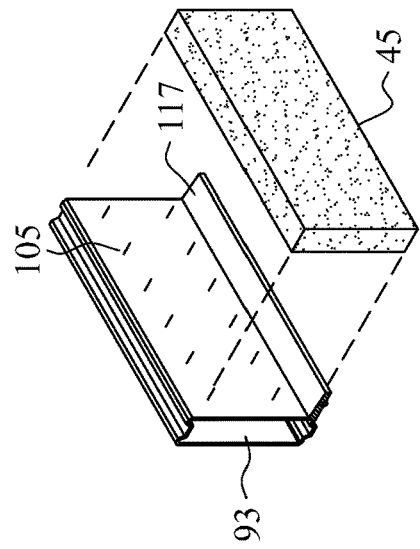

AUTOMATED VERTICAL PLANT CULTIVATION SYSTEM

CROSS REFERENCE TO RELATED APPLICATION[S]

This application is a continuation-in-part of the earlier U.S. Utility patent entitled "ATUOMATED VERTICAL PLANT CULTIVATION SYSTEM," Ser. No. 15/885,157, filed Jan. 31, 2018, which is a continuation-in-part of the earlier U.S. Utility patent application entitled "ATUOMATED VERTICAL PLANT CULTIVATION SYSTEM," Ser. No. 15/589,845, filed May 8, 2017, now U.S. Pat. No. 10,524,433, and claims priority to U.S. Provisional Patent Application Ser. No. 62/592,246, filed Nov. 29, 2017, now pending, the disclosures of which are hereby incorporated entirely herein by reference.

BACKGROUND OF THE INVENTION

Technical Field

This invention relates generally to a plant cultivation system, and more particularly to an automated outdoor modular vertical plant cultivation system suited to urban and suburban environments, employing seeded and planted plant vessels.

State of the Art

More than fifty percent of the world's population lives in urban environments, and this percentage continues to grow. This growth drives real estate prices higher, which in turn, reduces lot size affordability for the average income earner.

Urban and suburban single-family homes usually have front, back and side yards. Typically, the back-yard activities are more private and are associated with social, recreational and gardening activities. As real estate lot sizes diminish due to increasing cost, owners must decide which activities should have priority. In so doing, they often compromise on other activities. Furthermore, masonry CMU fence walls are commonly built in subdivision. These walls are architecturally unappealing and generate from manufactured through installation a significant carbon emission footprint. The CMU walls, concrete walls or combination of both are often used for commercial, and institution building. These walls share the same detriments as is in residential application often exacerbating the issues by the sheer size. In some applications, there is a need for sound attenuation reducing or eliminating noise travel from one side of the wall to the other. A common application for such a need is when a freeway or a noisy commercial facility is near residential neighborhoods. In such circumstances the residents typically face a tall and un-attractive wall creating a sense of imprisonment. To overcome the detriments of the conventional masonry or concrete wall, the present innovation grows on a vertical structure plant material while solving all privacy, security and sound transmittance issues.

SUMMARY OF THE INVENTION

The global warming effect on cities is felt by an increase in ambient temperatures and degradation of air quality. People's migration to cities is primarily driven by economic needs. According to the recent UN's World Urban Development report, over 66% of the world's population will dwell in urban environments by 2050.

As the migration to cities continues, real estate prices increase. To offset high real estate pricing, developers build multi-story buildings, further increasing human density. This increase comes with a toll on city dwellers' physical and mental health as the city's environmental conditions continue to be degraded.

Today the world is witnessing the harmful impact and becoming aware of the high cost of doing nothing. In cities worldwide, a growing number of people demand engineered and architectural solutions that ecologically improve city dwellers' wellness.

The city is composed of many mid/high rise structures in proximity to one another and circulation pathways between those structures. In the city, the use of plant material reduces the ambient temperature while improving the air quality. This innovation aims to transform urban structures' vertical planes to become plant walls, thus reducing the urban mass ambient temperature acting as a cleanser to purify the air of carbon dioxide, harmful chemicals and other pollutants.

The vertical green wall improves the biodiversity in urban environments, inviting complex plant and organism life that ultimately benefits the environment. The wall can employ shrubs as well as flower and fruit bearing plants. To efficiently sequester $CO_2$ and other harmful airborne pollutants, selected shrubs must be long-lived, require minimal maintenance and can withstand extreme weather conditions.

Several small leaf shrubs show a remarkable ability to sequester $CO_2$ from the air. This innovation focuses on well-established natural processes to clean the air and improve quality of urban living. Global adaptation of the green wall system can have a substantial impact, while scrubbing the air from pollutants.

Vertical green planes can be coupled to building elevations or can provide walls of separation. In the city there is an extensive use of walls separating public and private domains. Some walls come in the form of a fence that one can see through, while others are opaque. Opaque walls, often used next to roadways, have sound attenuation properties, blocking sound transfer across the wall. These walls are often defaced with graffiti writing. This innovation also looks to incorporate the utility of security, sound attenuation and retaining walls with the green wall, creating a new wall solution in which some aspects of the wall can be controlled by a processor coupled to an array of I.O.T. devices.

This innovation expands on application Ser. Nos. 16/202/858 and 16/202,821 introducing vertical plant wall panels within the planter shelves' wall structure in lieu of planter shelf vessels. In addition, this innovation is adapted to be placed by an existing wall, coupled to the wall and/or employing posts as described in submitted applications.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1A shows a partial front view of an automated outdoor modular vertical plant cultivation system, according to an embodiment;

FIG. 1B shows a partial top view of an automated outdoor modular vertical plant cultivation system, according to an embodiment;

FIG. 1C shows a partial front view of an automated outdoor modular vertical plant cultivation system with plant material, according to an embodiment;

FIG. 1D shows a partial top view of an automated outdoor modular vertical plant cultivation system with photovoltaic panels, according to an embodiment;

FIG. 2A shows a partial side view of a shelf an automated outdoor modular vertical plant cultivation system, according to an embodiment;

FIG. 2B shows a partial top view of a shelf an automated outdoor modular vertical plant cultivation system, according to an embodiment;

FIG. 2C shows a partial bottom view of a shelf an automated outdoor modular vertical plant cultivation system, according to an embodiment;

FIG. 3A shows a transverse section view of an automated outdoor modular vertical plant cultivation system, according to an embodiment;

FIG. 3B shows a transverse section view of an automated outdoor modular vertical plant cultivation system with a planter vessel, according to an embodiment;

FIG. 3C shows the planter shelf's flange bracket in perspective view, according to an embodiment;

FIG. 3D shows a transverse section view of the planter shelf with the flange bracket, according to an embodiment;

FIG. 4A shows a partial perspective view of a post with the shelf bracket bolted onto the post web of an automated outdoor modular vertical plant cultivation system, according to an embodiment;

FIG. 4B shows a front elevation of a shelf bracket of an automated outdoor modular vertical plant cultivation system, according to an embodiment;

FIG. 4C shows a back elevation of a shelf bracket of an automated outdoor modular vertical plant cultivation system, according to an embodiment;

FIG. 4D show side elevations of a shelf bracket of an automated outdoor modular vertical plant cultivation system, according to an embodiment;

FIG. 4E shows a bottom elevation of a shelf bracket of an automated outdoor modular vertical plant cultivation system, according to an embodiment;

FIG. 6A shows a partial vertical section of a double back-to-back automated outdoor modular vertical plant cultivation system showing the planter shelf's partition and acoustical wall panels, according to an embodiment;

FIG. 6B shows a partial vertical section of an automated outdoor modular vertical plant cultivation system showing the planter shelf's partition and acoustical wall panels, according to an embodiment;

FIG. 6C shows a partial vertical section of an automated outdoor modular vertical plant cultivation system backed against a sound attenuation panel, according to an embodiment;

FIG. 6D shows side elevation of a partition panel of an automated outdoor modular vertical plant cultivation system, according to an embodiment;

FIG. 6E shows front elevation of a partition panel of an automated outdoor modular vertical plant cultivation system, according to an embodiment;

FIG. 6F shows a perspective of a partition panel of an automated outdoor modular vertical plant cultivation system, according to an embodiment;

FIG. 7A shows a diagram of fluid circulation network, according to an embodiment;

FIG. 7B shows a diagram of data, power and power-consuming devices housed or attached to the vertical planter assembly, according to an embodiment;

FIG. 7C shows a consolidated diagram of a power inlet and fluid inlet, according to an embodiment;

FIG. 8A shows a partial view of crossbars penetrating through a planter shelf bridge with a fence, according to an embodiment;

FIG. 8B shows a partial elevation of a fence of an automated outdoor modular vertical plant cultivation system, according to an embodiment;

FIG. 8C shows a side elevation of crossbars penetrating through a planter shelf bridge with a fence, according to an embodiment;

FIG. 8D shows a partial transverse section of an automated outdoor modular vertical plant cultivation system top with a shelf containing roll-down tarps, according to an embodiment.

FIG. 10A shows a front elevation of the shelf bracket with side flanges according to an embodiment;

FIG. 10B shows a back elevation of the shelf bracket with side flanges according to an embodiment;

FIG. 10C shows a side elevation of the shelf bracket with side flanges according to an embodiment;

FIG. 10D shows a top elevation of the shelf bracket with side flanges according to an embodiment;

FIG. 10E shows a bottom elevation of the shelf bracket with side flanges according to an embodiment;

FIG. 13A shows a transverse section of the plant cultivation system employing a post, according to an embodiment;

FIG. 13B shows a transverse section of the plant cultivation system employing a chase post, according to an embodiment.

FIG. 13C shows a transverse section of the plant cultivation system employing a chase post and wall retaining flanges, according to an embodiment;

FIG. 14A shows a partial front view of an automated outdoor modular vertical plant cultivation system with a demising wall according to an embodiment;

FIG. 14B shows a partial top view of an automated outdoor modular vertical plant cultivation system plant shelf with a demising wall, according to an embodiment;

FIG. 14C shows a partial view of an automated outdoor modular vertical plant cultivation system, with plants and a demising wall, according to an embodiment;

FIG. 14D shows a partial top view of an automated outdoor modular vertical plant cultivation system top mounted photovoltaic panels and a demising wall, according to an embodiment;

FIG. 15A is a partial elevational view of a green wall, according to an embodiment;

FIG. 15 B is a horizontal longitudinal section view of the partial elevational view of FIG. 15A, according to an embodiment;

FIG. 16A is a transverse section view of a planter shelf and a typical longitudinal elevation of a shelf, according to an embodiment;

FIG. 16B is a transverse section view of a double-sided plant grow panel, according to an embodiment;

FIG. 16C is a transverse section view of a double-sided plant grow panel, according to an embodiment;

FIG. 16D is a transverse section view of a single sided plant grow panel, according to an embodiment;

FIG. 16E is a partial frontal elevation view of a planter shelf, according to an embodiment;

FIG. 18A is a section view of a double-sided green wall system with a sound attenuation wall panel between the plant grow panels, according to an embodiment;

FIG. 18B is a section view of a single-sided green wall system, according to an embodiment;

FIG. 22A is a perspective view of a plurality of horizontal strips coupled to the planter shelf's vertical wall with the strip's surfaces populated by miniaturized spires with hooks, according to an embodiment;

FIG. 22B is a perspective view of a plurality of horizontal strips with spikes coupled to the shelf's vertical wall, according to an embodiment; and FIG. 22C is a perspective view of an incremental fastening structure at the top side of the plant grow panel, according to an embodiment.

DETAILED DESCRIPTION OF EMBODIMENTS OF THE INVENTION

Figure 5B:
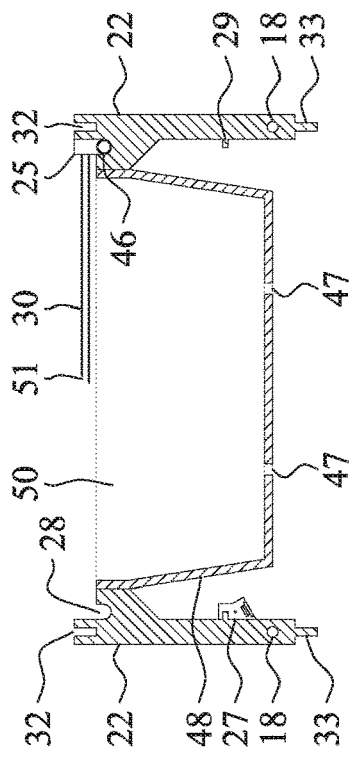
FIG. 5B shows a transverse section taken along line 5B-5B of FIG. 5a of a planter vessel opening of a shelf of an automated outdoor modular vertical plant cultivation system, according to an embodiment.

An automated outdoor modular vertical plant cultivation system solves the yard space problem by transforming the property fence into a vertical garden, thus freeing both the back and side yards for other activities.

The System is a structural post and beam frame load bearing wall. Its horizontal beams retain plant material 43. The beams described herein as the planter shelves 20 are shaped like the letter "I" and are rotated horizontally with their top end flanges shorter than their bottom end flanges. The planter shelves' web 21 is perforated with modularly spaced plant vessel openings 23 into which planter vessels 50 are placed. The planter shelf 20 can be placed anywhere along the vertical face of the post 2, mounted to the shelf bracket 15.

At least one inner side of the post flanges 6 above the planter shelf web 21 contains an irrigation pipe 30 extending the length of the shelf with a "T" junction 25 spaced at the same spacing as the planter vessel openings 23. The planter vessel irrigation pipe 30 connects to the "T" junction with a pipe that extends over the planter vessel's irrigation aperture 42. In a different embodiment employing drip irrigation, the planter irrigation pipe may be embedded inside the planter vessel 50 or connected to a port in the planter vessel. The irrigation circulatory system may contain nutrients and/or pesticide solution/s. These additives can be poured into the fluid container/mixing tank 14 mounted to the post 2 and/or placed inside the tarp housing 52 section.

At least one inner side of the planter shelf flanges 22 below the web 21 has power or power and data conductor/s 2 extending the length of the shelf with connectivity to a plurality of concealed light devices 27. The light devices 27 are aimed at plant material 43 below. The light devices' 27 placement is associated with the placement of the planter vessels 50 of the shelf. In addition, power consuming devices can be attached to the planter shelves 20, posts 2, planter vessels 50, and the surrounding area. These devices may include a pump 11, a processor 56 with resident memory and program, communication module for both wired and wireless devices 61, controller 57, camera 34, speaker 35, microphone 62, occupancy sensor 63, humidity sensor 36, temperature sensor 64, perimeter security sensor 65, backup storage device 10, inverter 53, driver 54, power supply 69, and power generating device 52. In some embodiments a plurality of devices can be mounted on a tray (not shown) and the tray can be mounted to the post's wall 84. Such tray can be assembled and secured to the post's wall 84 or other enclosure/s 74 away from the installation location, reducing assembly time and opportunity for installation error/s.

Non-powered devices may include protective tarp 37 to provide protective covering to plant material 43 against frost, partition panels 31 and crossbars 39 to turn the System into an impenetrable fence.

The planter shelves' 20 assembly may permit viewing beyond the planter, or not. Grooves 32 extending the length of the planter shelf top flanges 22 and protrusions at the bottom flanges provide mounting contact surfaces for tongue and groove modular partition panels 31. The panels may vary in width, length and height, based on application needs. In a different embodiment, the System provides a vertical garden for two adjoining properties. In this scenario, the vertical planter assembly 1 partition panels 31 are located at the longitudinal center of the planter shelf 20 with planter vessel openings 23 on both sides.

The planter shelves 20 are bolted onto "L-shaped" shelf brackets 15 which are also bolted into the "I-beam" shaped post 2. The brackets 15 are mounted along the post web 5, having bores 17 pre-drilled at repeated spacing. The post 2 and planter shelves 20 assembly height is constrained only by its ability to support its own weight and to resist wind load forces. When the planter shelves 20 are fabricated of a none-metallic, the shelves' span can be extended by embedding tensile reinforcement 18 at the bottom end of the flanges 22. That reinforcement can take the entire cross-sectional interior area of both the shelf 20 and/or the post 2.

The post may support additional elements aside from the planter shelf. In one embodiment, the post's horizontal cross-section shows three flanges on each side of its web (not shown). One of the exteriors facing flanges and the center flange support the axial load of the planter shelf/s. The other exterior facing flange and the center flange support the lateral loads of the panelized wall.

In applications where a sound attenuation wall 77 and/or thicker wall is required, the shelf retaining post 2 can be configured to retain such walls without inducing vertical loads on the post 2. The post then can be fabricated monolithically having flanges 6 to retain the wall panels 67 and chase walls 84 to mount the planter shelves 20 employing the planter shelf brackets 15. Referred herein as the chase post 83, the chase post 83 reduces the load of the planter shelves 20 by dividing the loads of the shelves between two walls each carrying the load of its corresponding side shelves. The space between the two walls can then become a chase that can retain the cultivation system power 99, processing 96, communication 98 and fluid 100 electro-mechanical key elements secured and protected from the elements. The chase post 83 with wall can retain planter shelves 20 on one or both sides. The width of the wall can be variable. The post 2 and the chase post 83 can be directly embedded in the ground or resting on a foundation. Directly embedded posts 2, whether supporting planter shelves 20 only or supporting planter shelves 20 and wall panels 67, can also be driven into the ground. In such application the bottom of the post 2 may have a tip to enable easier soil penetration (not shown).

The System's entire assembly can be fabricated from metallic or non-metallic non-corrosive material resistant to minerals and pollution. Metallic members can be anodized or galvanized. Metallic members may also be coated with non-corrosive material like a polymer with paint bonding surfaces. The assembly's key elements, the post 2 and the planter shelves 20, can be fabricated through the process of extrusion with the ability to control the members' cross-sectional profile. Also, the fabrication of the flange walls can be altered to provide different appearances and support different plant vessels' 50 loads. The assembly surfaces can be painted and coated with UV inhibitors.

The System is also suited to public works environments such as a separation between roadways and residential neighborhoods, institution buildings such as museums and court buildings, commercial buildings such as offices and malls, multi-family apartments/condominiums, and vertical community gardens in cities' vacant lots. When the System is employed between noise generating public ways and residential neighborhoods, the assembly can employ both sound attenuation panels and planter shelves in concert.

FIGS. 1*a*, 1*b*, 1*c*, and 1*d* show partial views of the planter shelf assembly 1.

FIG. 1*a* shows the planter shelf assembly 1 key elements. These elements include the shelf support post 2 and the planter shelf 20. Also shown in this embodiment is a tarp housing 74 at the top of the assembly. The tarp housing 74 is used in climactic zones where plant material 43 is exposed to freezing temperatures. When temperatures drop to freezing levels, the tarp pull bar 70 is pulled down to cover the planter assembly 1 and secured to hooks 1*a* shown at the figure's bottom shelf. Each of the planter shelves has pre-fabricated hook bores 71 enabling the tarp placement as needed. Also, with extender bars (not shown), the tarp can be pulled horizontally, providing shade in front of the planter shelf assembly 1.

In another embodiment, the top shelf can be an enclosure to electronic and data equipment, and/or plant material 43 fluid storage and/or mixing tanks. A top cover 59 is common to all top shelves retaining a volumetric enclosure(s).

FIG. 1*b* shows a top view of the planter shelf 20 mounted onto a post 2. The planter shelf flanges 22 are integrally connected to the planter shelf web 21. The web is also referred to as the bridge 24. Planter shelf plant vessel openings 23 populate the planter shelf web 21 at a repeating pattern having the web bridge 24 provide a vessel's ledge 41 to support the planter vessel 50. Also shown is the plant irrigation pipe 46 over the center of the plant irrigation aperture 42.

FIG. 1*c* shows the same features as FIG. 1*a*. It also shows plant material 43 spaced apart on three planter shelves 20. The spacing of the planter vessels 50 can be flexible based on plant material 43 needs and architectural preference.

FIG. 1*d* shows the top view of the shelf plan assembly 1 with photovoltaic panels 52 placed on top of the top cover 59. When photovoltaic panels 52 are used, inverter 53, power supply 69 and backup power storage device 10 can be retained inside a top shelf enclosure (not shown).

FIGS. 2*a*, 2*b* and 2*c* show partial enlarged side, top and bottom views of the planter shelf 20.

FIG. 2*a* shows the planter shelf 20 side view. The view shows the planter shelf flange 22 jointed to its web/bridge 21/24 beyond and an optional tensile reinforcement 18 embedded inside the shelf flange 22. Also shown at the bottom of the flange is a continuous shelf flange partition protrusion 72.

FIG. 2*b* shows the planter shelf 20 top view. Elements shown include partition insert groove 32, "T" junction 25, planter vessel irrigation pipe 30, planter irrigation pipe 46, planter shelf flange 22, planter shelf web/bridge 21/24, planter shelf plant vessel opening 23 and cross bar bore 40. The plant vessel 50 (not shown) is inserted into the plant vessel opening 23 supported by ledges at the bridge 24. The bridge may have a means to lock the plant vessel 50 in place to eliminate plant vessel 50 theft risk (not shown).

FIG. 2*c* shows the planter shelf 20 bottom view. Elements shown include the planter shelf web/bridge 21/24, crossbar bore 40, plant vessel 50, lighting device 27, power/data mounting protrusion 29 on the inner face of the opposite flange 22. The planter shelf plant vessel opening, and plant irrigation pipe 46 have fluid nozzle 51 over the plant irrigation aperture 42 (not shown).

FIGS. 3*a* and 3*b* show transverse sections through the planter shelf 20 including its irrigation and power/data conveyance devices.

FIG. 3*a* shows the planter shelf 20 having two flanges 22 and planter shelf web bridge 21/24 joining them in proximity to the shelf's top. Along the top of the flanges 22, partition insertion grooves extend the length of the shelf. Next to the grooves on the inner face of the flanges 22, fluid pipe grooves 28 extend the length of the shelf. The planter irrigation pipe 46 retained inside the pipe groove 28 with a "T" junction 25 diverts fluid to the plant vessel 50 through the vessel's irrigation pipe 30. At the flanges' 22 inner face toward the bottom, power/data protrusion 29 provides mounting surface to power- and data-consuming devices. In this embodiment a continuous lighting device extends the length of the planter shelf 20. Also shown in this embodiment are optional tensile reinforcements 18, and at the bottom of the flanges 22, shelf flange partition protrusions.

FIG. 3b shows the same section as FIG. 3a, also including a plant vessel. Additional elements shown are plant material 43, plant vessel 50, moisture evacuation outlet 47, root retaining medium 73, and plant irrigation aperture 42.

FIG. 3C shows a perspective of the shelf flange bracket 7. The bracket bridges between the planter shelf flanges 22 and the shelf flanges below the web bridge 24. The bracket is secured to the shelf flanges 22 with bolts 19. The bracket 7 protects the planter shelf flanges 22 from flaring out and/or caving in. The bracket 7 can be installed at factory or in the field and be placed intermittently. As with other members of the vertical cultivation system, the bracket 7 can be made of metallic or non-metallic material. In some embodiments in lieu of the bracket a bridge similar to the planter vessel bridge can be factory pre-fabricated (not shown).

FIG. 3D shows the same section as 3B also employing the planter flange bracket 7.

FIGS. 4a, 4b, 4c, 4d, and 4e show the vertical planter assembly 1 planter shelf 20 as support elements. These elements include the post 2 and the shelf bracket 15.

FIG. 4a shows a partial perspective view of the post 2 with the shelf bracket 15 bolted onto its post web 5. In another embodiment through-bolts 16 can connect the flanges of the post 6 to the flanges of the planter shelf 22 adding support strength. FIG. 9a shows the post 2 with such bores pre-drilled 17. The post web 5 and its flanges may contain optional tensile reinforcements 18 embedded in its wall. The web and the bracket can be fabricated of metallic or non-metallic non-corrosive material resistant to pollution and adapted to require paint and/or UV coating. Pre-drilled bores 17 at repeated spacing extending the length of the post webs enable mounting the shelf bracket 15 at suitable spacing between planter shelves 20. Also shown are a fluid pipe 12 and power or power and data conduit 13 in proximity to the junction point between the post flanges 6 and the post web 5. Irrigation equipment and power devices mounted to the post's web 5 are accessible from the planter shelf 20 side. In some embodiment the irrigation equipment can be enclosed by a cover (not shown). Other equipment can be placed inside a top shelf enclosure shown in FIG. 8d element 74.

The shelf bracket 15 has two bores 17 at its top surface and an additional two bores 17 at its side wall. Bolts 16 secure the bracket 15 to the planter shelf 20 above the post web at its side wall. The post web can accept brackets 15 from both sides employing a single bolt 16 per bore 17. To increase the bracket 15 capacity to support the planter shelf, the bracket employs two bracket ledge stiffeners 75 joining the bracket's top surface with the side wall. FIG. 4b shows the bracket 15 front view. FIG. 4c shows the bracket 15 back view. FIG. 4d shows the bracket 15 side views and FIG. 4e shows the bracket 15 bottom view. In a different configuration, the shelf bracket 15 may have side flanges 87. These flanges 87 abut the post web flanges 6 securing the planter shelves 20 and bracket 15 to the post 2 with bolts 19.

Figure 5C:
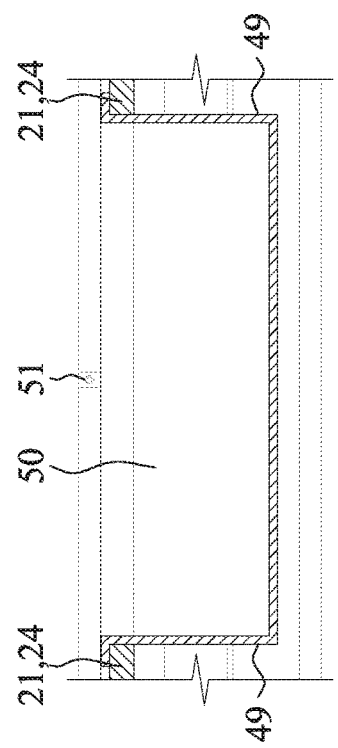
FIG. 5C shows a longitudinal section taken along line 5C-5C of FIG. 5a of a planter vessel opening of a shelf of an automated outdoor modular vertical plant cultivation system, according to an embodiment.
Figure 5A:
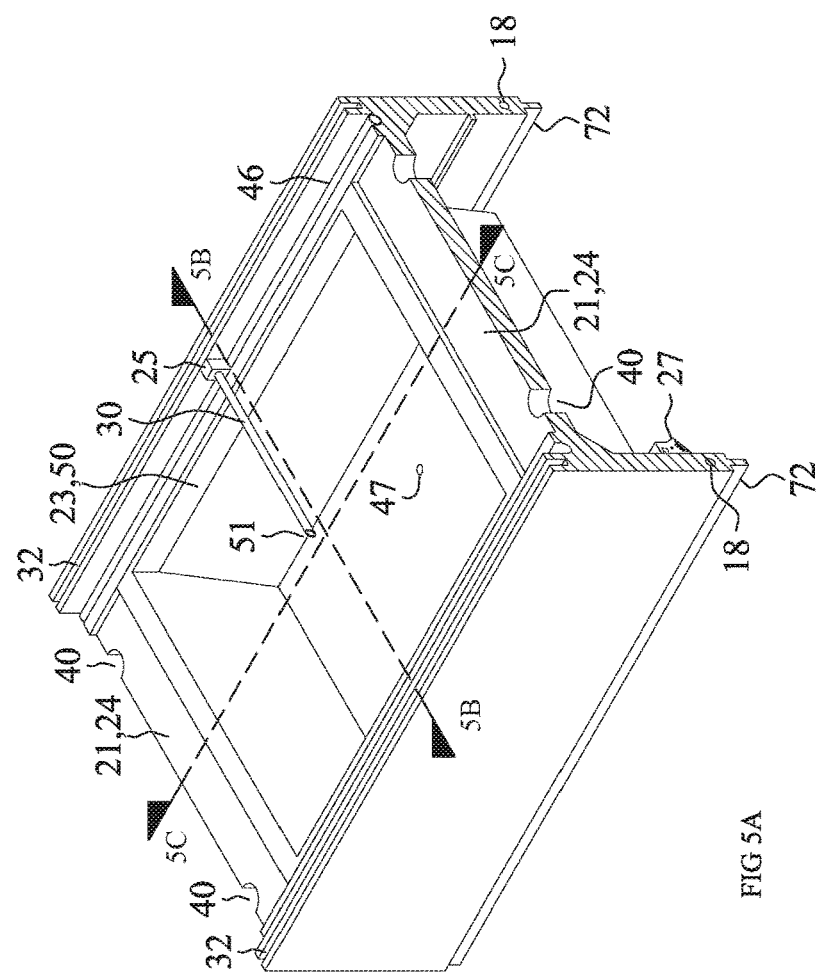
FIG. 5A shows a perspective of a planter vessel opening of a shelf of an automated outdoor modular vertical plant cultivation system, according to an embodiment.

FIG. 5a and sections 5b-5b and 5c-5c show the plant vessel 50 in perspective inserted inside a section of the planter shelf 20 and in section view perpendicular to one another inside the planter shelf.

FIG. 5a perspective view elements include the planter vessel opening 23 enclosed by fire walls of the planter vessel 50, the fluid irrigation system including the planter irrigation pipe 46, the "T" junction 25, the vessel irrigation pipe 30, and the pipe nozzle 51. The plant vessel hangs on the planter shelf web/bridge 21/24 having ends on its longitudinal sides parallel to the planter shelf's 20 longitudinal axis overhung projection.

Also shown are the bridge crossbar bore 40, lighting device 27, optional tensile reinforcement 18, shelf flange partition protrusion 72, and partition insert groove 32.

FIG. 5b is a transverse section across the planter shelf 20 through the plant vessel 50. The plant vessel 50 is tapered in at both sides of the planter shelf flanges 22 concealing the light device 27 from view while permitting it to illuminate the plant material 43 below. Also shown is the plant vessel fluid system including the planter irrigation pipe 46, the "T" junction 25, the vessel's irrigation pipe 30, its fluid nozzle 51 and the fluid evacuation nozzle 51.

FIG. 5c is a longitudinal section through the planter vessel 50 parallel with the planter shelf's longitudinal axis. This section shows the planter vessel's non-sloped walls 49 with two overhung ears resting on the planter shelf web/bridge 21/24.

FIGS. 6a, 6b and 6c show different planter configuration transverse partial sections through the vertical planter assembly 1.

FIG. 6a shows a double back-to-back vertical planter assembly 1 with partition panel 31 obstructing the view beyond the plant vessel 50. This embodiment could be used as a party wall/fence in residential sub-divisions and/or in urban community gardens.

FIG. 6b shows a similar view with only a single shelf planter 20.

FIG. 6c shows an embodiment with a single shelf planter 20 backed against a sound attenuation panel 78. The panels 78 are modular and provide both a visual barrier and reduce/eliminate sound travel through the wall. Where sound mitigation is needed, sound cancellation devices 79 can be added to the vertical planter assembly 1 system.

The above three embodiments also show plant material 34, the plant vessel fluid system 46/30/51 and the lighting system 27.

FIGS. 6d, 6e and 6f show the tongue and grove partition panel 31 system.

FIG. 6d shows a side view of a typical partition panel 31. On top of the panel, a partition panel groove 32 extends the length of the panel. At the bottom, a partition protrusion extends the length of the panel. Dashed lines shown on the panel's longitudinal axis represent partition stiffener bores 68. Fig. FIG. 6e is a front view of the panel and FIG. 6f shows a perspective view of the partition panel 31.

FIGS. 7a, 7b and 7c show the fluid, the data, the sensing, the power and the control devices for the vertical plan assembly 1. The assembly figures are depicted employing three diagrams for clarity. In actuality, they share common elements, and may operate by the same processor 56 and controller 57.

FIG. 7a shows the vertical plan assembly 1 fluid circulation network. Planter irrigation pipe 46 riser delivers fluid to the planter shelf 20. The fluid pipe 12 is positioned vertically against the post web 5 with "T" junction 25 connectors in proximity to the mounting shelf bracket 15. From there, the fluid travels through the planter irrigation pipe 46 on through a secondary "T" junction 25 connector to the vessel irrigation pipe 30 and into the plant vessel 50 through the pipe's fluid nozzle 51. The irrigation piping network can be fabricated of polymer material resistant to UV subject to wide variance in temperature.

FIG. 7b shows data, power and power-consuming devices housed or attached to the vertical planter assembly. The devices include an antenna 55, 10/53 backup power storage device/invertor, photovoltaic panels 52, lighting device 27, moisture sensor 36, occupancy sensor 63, temperature sensor 64, security sensor 65, camera 34, speaker 35, microphone 62, and noise cancellation device 80.

FIG. 7c shows the power inlet 8 and fluid inlet 76. The vertical assembly can operate all system devices including or excluding the irrigation system. Typically, the electrical system operates a pump 11. Fluid entering the inlet 76 can be stored in a fluid container/mixing tank 14 or directly pumped through to plant material 34. The pump may also divert fluid into the fluid container/mixing tank 14 and from there fluid may reach the plant material by gravity force or through the pump. The pump and the fluid container/mixing tank 14 can be located inside a shelf, against the post web 5 or in a remote location away from the vertical plant assembly 1.

The power and data key elements of the vertical plant assembly 1 include a processor 56, a controller 57, a communication module 61, power module 58 and power supply 69. In some embodiments, the assembly 1 may also include a backup power storage device 10 and/or an inverter 53. The entire power and communication network operate by low voltage power.

FIGS. 8a, 8b and 8c show the planter shelf 20 crossbars 39. The crossbars provide a mounting structure for a security fence 81. The crossbars' 39 bores 40, in conjunction with the bars 39 or without, can provide a mounting location for securing the planter vessel 50 against theft.

FIG. 8a shows a plan view of crossbars 39 penetrating through the planter shelf bridge 24 with a fence 81 extending from bar 39 to bar 39.

FIG. 8b shows in elevation view an exemplary embodiment of the fence 81 with rings. The fence 81 rings are inserted into the crossbars 39 during the vertical planter assembly 1 erection to form a continuous fence.

FIG. 8c shows the planter shelf 20 elevation with the crossbars 39 penetrating through.

FIG. 8d shows the vertical planter assembly 1 top with a shelf containing tarps 66. The tarps protect plant material 43 against frost. The tarps are coiled around a bar with retractable capability pulling against the tarp pull bar 70. The tarp housing 74 is divided into two chambers, whereas the dividing wall provides support for the housing's top cover 59. Photovoltaic panels 52 can be mounted on the top cover 59 and an inverter 53 and/or back-up power/storage device 10 can be placed inside the tarp's housing 74. Further, the housing can also be used to retain power and irrigation devices.

Figure 9C:
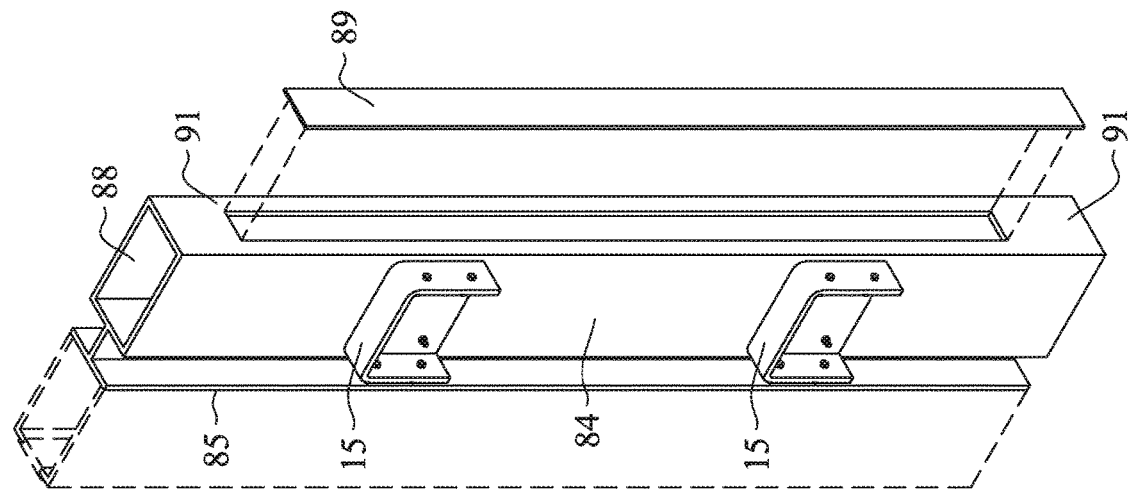
FIG. 9C shows a perspective of the chase post with shelves and wall retaining flanges according to an embodiment.
Figure 9B:
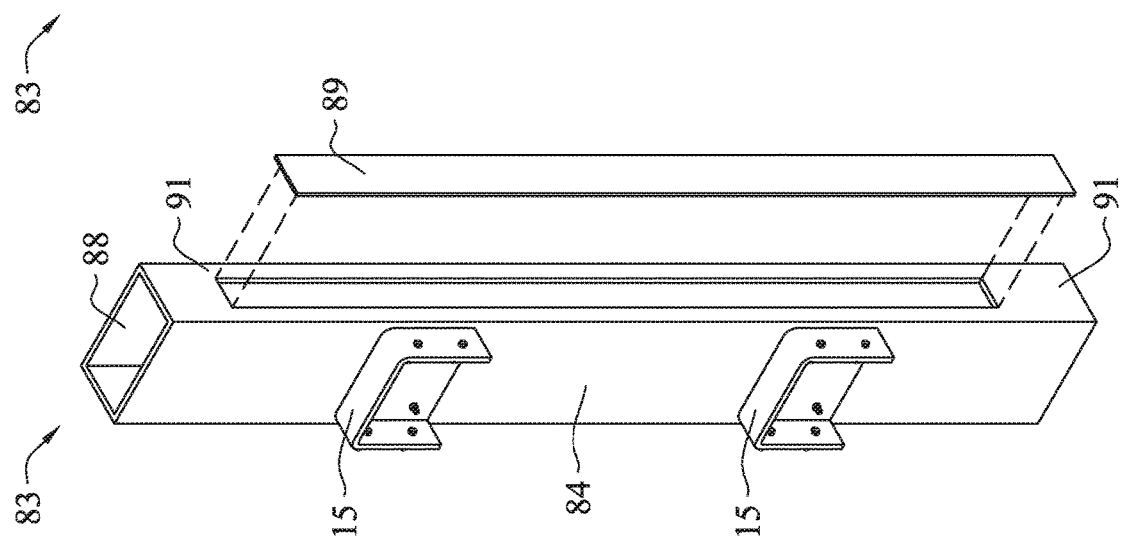
FIG. 9B shows a perspective of the chase post with shelf brackets according to an embodiment.
Figure 9A:
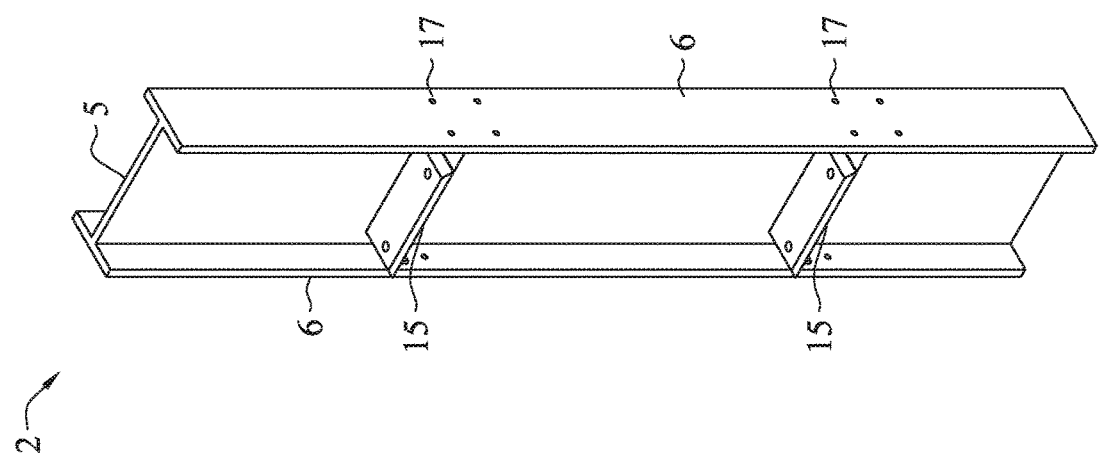
FIG. 9A shows a perspective of the post with shelf brackets according to an embodiment.

FIGS. 9a, 9b and 9c show perspective views of the plant cultivation system shelf support post.

FIG. 9a shows a perspective view of the post shown in FIG. 4a, in partial perspective. In this configuration, the post 2 shows a web 5 and flanges 6 on both sides. Post brackets 15 are mounted to the post 2 web 5, and bores 17 drilled into the post flanges 6 can connect the post 2 to the planter shelf flanges 22 using bolts 19.

FIG. 9b shows a perspective view of the chase post 83 supporting the planter shelves 20. In this configuration, as is in FIG. 9a, the planter shelves 20 rest on and are secured to the shelves' brackets 15. The brackets are secured to the chase post wall 84. The brackets' flanges 87 in this configuration attach directly to the shelf flanges 22, in the absence of post flanges 6 to attach to. The chase post 83 retains power 99, communication 98, sensing 97, and processing devices 96, as well as electromechanical fluid circulation equipment 95. Power 99, plant fluid 100, or both typically enter the chase post 83 from below, connecting to its devices inside, and from there power 99 and fluid 100 is/are networked to the shelf's plant vessel/s 50 and electrical devices. The chase post enclosure 88 is secured by an access panel 89 mounted onto the chase post outward wall 91. The panel may employ a tamper-proof lock/s 92 and support the placement of power devices mounted onto its interior and exterior surfaces.

FIG. 9c shows a perspective view of the chase post 83 supporting the cultivation system shelves and a panelized wall 67 system on one side of the cultivation system's longitudinal sides. In this configuration, the planter shelves 20 rest on and are secured to the shelf bracket 15 whereas the bracket is secured to the wall of the post 84. Interlocking panels 67 placed on one another and wedged between the chase post flanges 85 form a wall. At the top of the post 83, an anti-uplift device attached to the post secures the wall from uplift movement. The chase post 83 retains power 99, communication 98, sensing 97, and processing devices 96, as well as electromechanical fluid circulation equipment 95. Power 99, plant fluid 100, or both typically enter the chase post 83 from below, connecting to its devices inside, and from there power 99 and fluid 100 is/are distributed across the network of shelves. The chase post enclosure 88 is secured by an access panel 89 mounted onto the chase post outward wall 91. The panel may employ a tamper-proof lock/s 92 and support the placement of power devices mounted onto its interior and exterior surfaces. Also shown in this embodiment (in dash line) is an alternate double-sided planter shelf 20 with a panelized wall 67 between.

FIGS. 10a, 10b, 10c, 10d, and 10e, show the planter shelf bracket elevation compatible with post configuration shown in FIGS. 9b and 9c.

FIG. 10a shows the front elevation of the shelf bracket 15 facing the planter shelf 20. In this embodiment the bracket 15 attaches to the chase post wall 84 by four through bolts 16 and to the planter shelf 20 with two bolts 19 at each side of the shelf bracket 15 connecting to the planter shelf flanges 22.

FIG. 10b shows the back elevation of the shelf brackets 15 facing the chase post wall 84. In this embodiment the bracket 15 attaches to the chase post wall 84 by four thorough bolts 16 and to the planter shelf 20 with two bolts 19 at each side of the bracket 15 connecting to the planter shelf flanges 22.

FIG. 10c shows two side elevations of the shelf bracket 15 with two bores 17 at its flange 87 and two bores 17 at its vertical wall abutting the chase post wall 84. On top, the bracket's shelf seat 86 supports the planter shelf 20 during installation. This support enables the installer to drill bores or drill bores 17 and thread bores 17 precisely where needed without having to support the planter shelf 20.

FIG. 10d shows an elevation of the shelf bracket's 15 top with the bracket's planter shelf seat 86, two bores 17 at the wall facing the chase post wall 84 and a single bore 17 at each flange 87 side.

FIG. 10e shows an elevation of the shelf brackets' 15 bottom with the bottom of the planter seat 93, above, two bores 17 at the wall facing the chase post wall 84 and a single bore 17 at each flange side 87.

Figure 11:
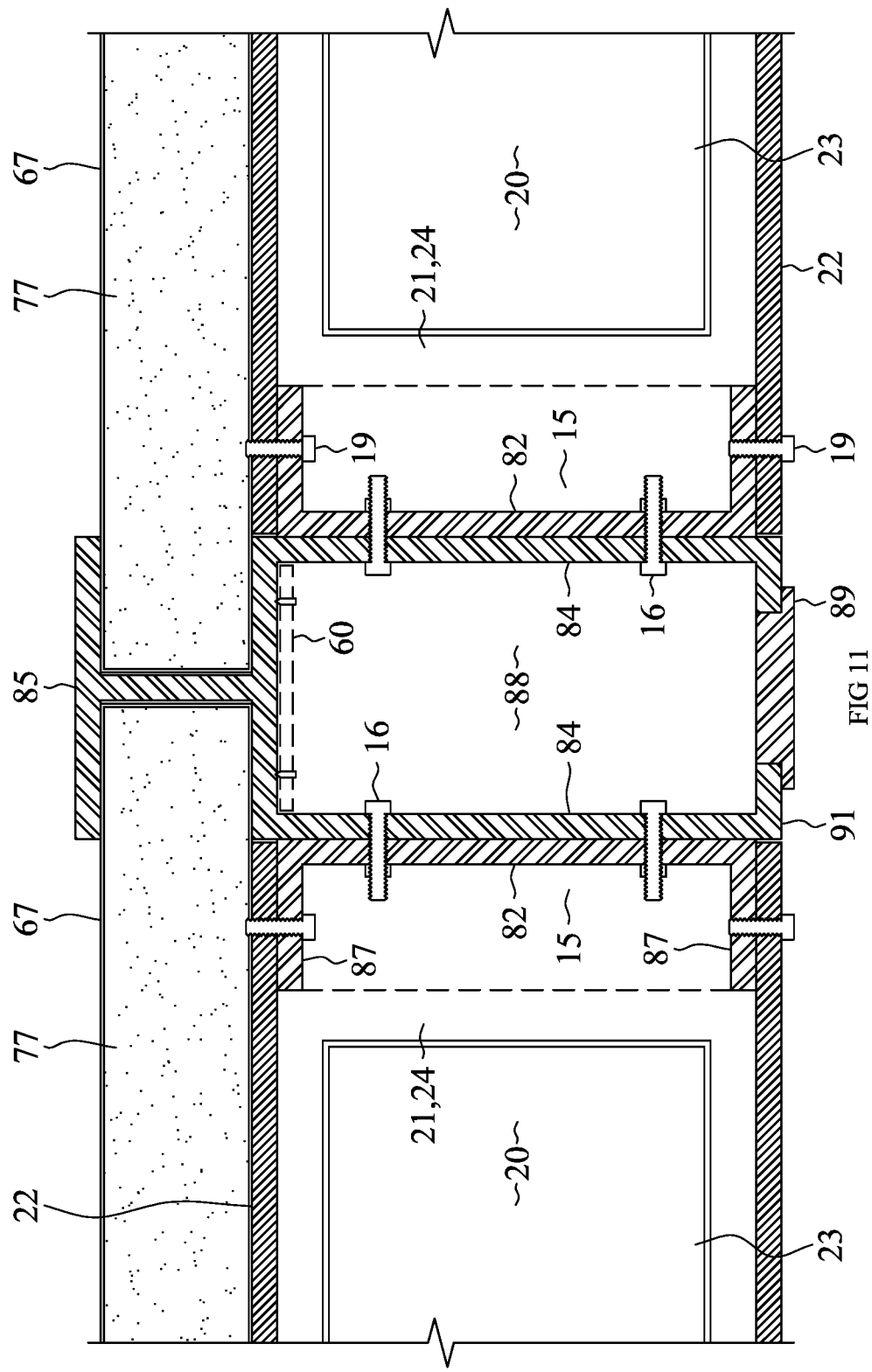
FIG. 11 shows an enlarged horizontal section of the chase post just below the planter shelf cross bridge, according to an embodiment.

FIG. 11 shows an enlarged horizontal section through the chase post 83 with planter shelves 20 abutting its wall 84 and attenuation wall panels 67 wedged inside its flanges 85. The chase post enclosure 88, walls shown supporting the load of the planter shelves with both connected by through bolts 16 to the shelves bracket 15. The access panel 89 is shown mounted against the chase's outer face 91 enabling easy access to the chase post's enclosure 88. Also shown are partial section designations showing shelf 20 connectivity to the chase post 83 in FIGS. 12a and 12b.

Figure 12B:
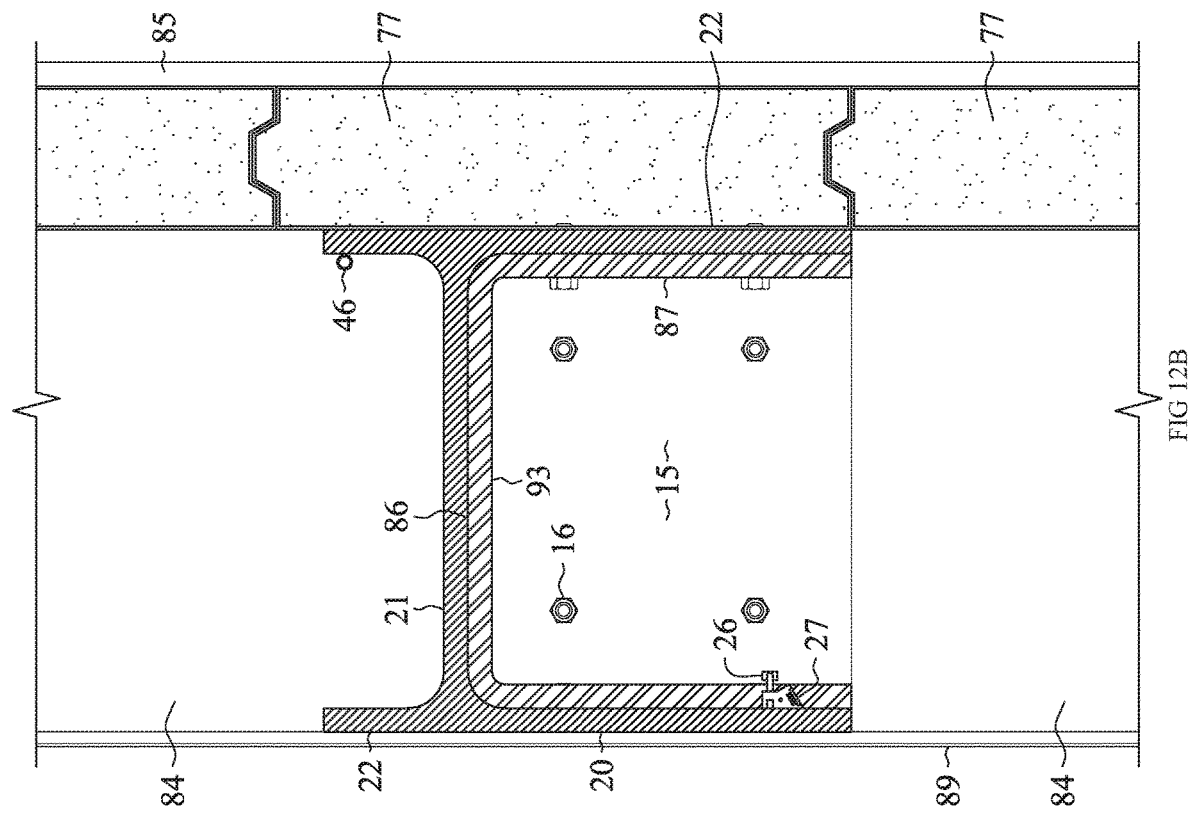
FIG. 12B shows an enlarged partial planter and sound attenuation wall transverse vertical section, according to an embodiment.
Figure 12A:
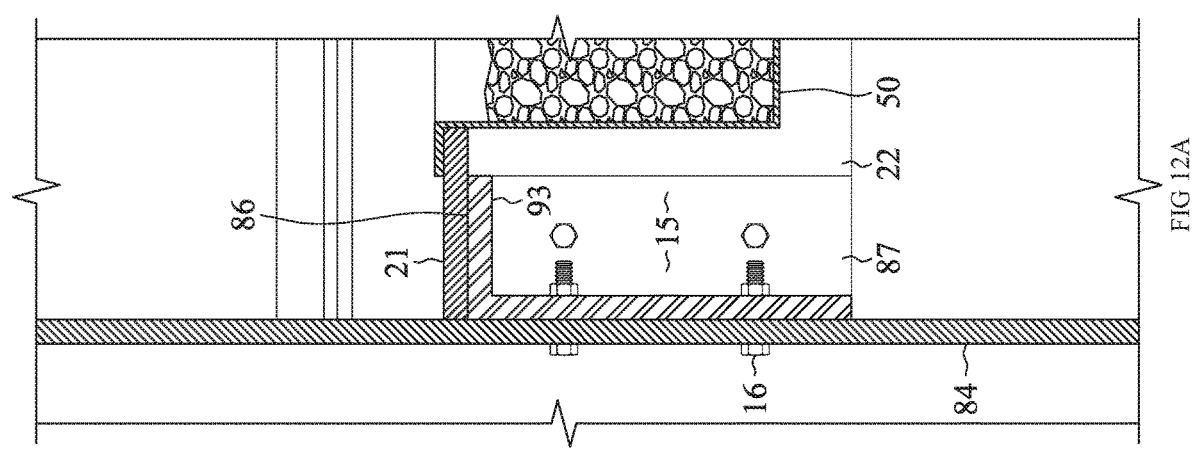
FIG. 12A shows an enlarged partial planter shelf interior vertical section between the chase post the planter shelf and the post bracket, according to an embodiment.

FIGS. 12a and 12b show enlarged partial sections showing the planter shelf's 20 connectivity to the chase post wall 84.

FIG. 12a shows a partial enlarged vertical section of the planter shelf 20 supported by the planter bracket 15 connected to the chase post wall 84. This section also shows the planter shelf 20 inner side flange 85 with the paneled wall 67 behind. The section shows a pair of bolts 19 spaced apart at the inner planter wall flange 22, a pair connecting the shelf bracket 15 to the chase post wall 84.

FIG. 12b shows a partial enlarged transverse vertical section through the planter shelf 20 and the panelize wall 67 looking toward the chase post shelf supporting wall 84. Elements shown include an outline (in dashed line) of the plant vessel 50, a continuous light source mounted to the inner face of the plant shelf 20 outer flange 22 at its bottom, a continuous shelf irrigation pipe 46 at the top, the shelf bracket 15 with bolts 19 attaching the bracket 15 to the chase post wall 84 and to the flanges of the plant shelf 22 and wedged between the chase post flanges 85, sound attenuating panels 77. Inside the bottom side of the shelf flanges 22, a pair of high tensile strength bars 18 are shown embedded. When long plant shelf span is required, and/or the plant vessels weight is heavy, the tensile bars/s 18 help reduce the cross-sectional depth of the shelf's flanges 22.

FIGS. 13a, 13b, and 13c show transverse sections of the planter cultivation system according to the three post embodiments shown in FIGS. 9a, 9b, and 9c.

FIG. 13a, shows a transverse section of the planter shelf 20 employing a retaining post 2 with shelf brackets 15 as shown in FIG. 4. In this embodiment, the planter web bridge 24 rests on the bracket's planter shelf seat 86 and is secured by two through bolts 19. In an alternate embodiment, securing bolts 19 through the flanges of the planter shelf 22 and the post wall. (not shown)

FIG. 13b shows a transverse section of the planter shelf 20 employing a retaining chase post 83 with shelf bracket 15 shown in FIG. 10. In this embodiment the planter shelf web bridge 24 rests on the bracket planter shelf seat 86 and is secured to the chase post by two bolts 19 connecting the bracket's flanges 87 to the planter shelf flanges 22 at both sides. In this embodiment the top shelf shows an enclosure containing a roll-down tarp 66.

FIG. 13c shows a transverse section of the planter shelf 20 employing a retaining chase port 83 with shelf brackets 15 shown in FIG. 10 and wall retaining flanges 85. In this embodiment, the planter shelf 20 arrangement is the same as shown in 13b with exception of the chase post 83 cross section. The chase post 83 includes a wall retaining flange 85. The flange 85 may be one sided or two sided. This figure shows a one-sided configuration with a second side in dashed line. The wall shown in this embodiment is panelized 61 where the keyed panels 78 rest on one another and are wedged between the chase post flanges 85. The top shelf shows an enclosure 74 containing a power storage unit 55 and photovoltaic panel/s 52 on top.

FIGS. 14a, 14b, 14c, and 14d show partial front and top elevations of the chase post 83 with shelves mounted on both sides and a panelized wall behind the shelves 61.

FIG. 14a shows a partial front elevation of the chase wall 91 absent its access panel 89 with the planter shelves 20 supported by the planter shelves bracket 15 mounted to the chase post wall 84. Also, shown behind the planter shelves 20 are wall panels 78.

FIG. 14b shows the top view of the vertical cultivation system employing a chase post 83 absent the post's top cover. In this figure, the chase post 83 enclosure and the panelized wall 67 wedged in between the post's flanges 85. Fluid circulation pipes 12 rising inside the chase enclosure 88 are shown flaring out through the walls of the chase to run along the inner side of the planter shelf flanges 22 with drip spouts 30 positioned over the planter vessels 50 opening.

FIG. 14c shows a partial front elevation of the chase post outward 91 wall with its access panel cover 89 supporting plan shelves 20 populated with plant vessels 50 and panelized wall 61 behind. Also shown in this figure is one tamper proof lock 92 for the chase access cover 89 and surveillance camera 34 at the top of the access panel 89.

FIG. 14d shows the top view of the vertical cultivation system employing a chase post 83. In this figure, photovoltaic panels 52 are shown mounted to a top shelf. The top shelf may have an enclosure 74 that retains a power storage device 58, roll-down tarp 66, and other devices requiring an enclosed space. Next to the photovoltaic panels 52, the top face of the panelized walls 67 is shown with up-lift locks 94 securing the panel to the post's web and/or flanges 85.

Green Wall Plant Grow Panel and the Planter Shelf FIGS. 15A-30C

The vertical green wall system is comprised of a plurality of vertical grow plant panels coupled to planter shelves, forming a green wall. The shelves can be stacked on one another transferring their combined weight directly to a surface below, supported by posts, coupled to a vertical support structure or supported by a combination of the methods described.

Each vertical plant grow panel root structure faces the vertical wall of the planter shelf while the plant growing side is oriented oppositely, facing open space.

The plant species grown by this cultivation system are adapted to the selected location climactic conditions and the grow panel embodiment's form. Such plant species can be grown vertically having a shallow root system and securely coupled to the cultivation system planter shelves.

This innovation is a continuation to two prior applications expanding on the planter shelf utility in providing a natural solution to reduce airborne pollutants and lower ambient temperature. The solution also enhances the urban environment by reducing noise, reducing area for graffiti writing on walls, and most of all by adding green softscape to offset the city's harsh hardscape.

The modular green vertical shelf wall is a planar embodiment composed of planter shelves that are coupled to plant grow panels. The wall's shelves with the coupled plant grow panels can be stacked on one another to form a solid wall or can retain at least one gap between shelves. The shelves' vertical member can be fabricated as a solid partition wall or as a volumetric wall. The volumetric wall interior space can be voided or filled with a fill material. Fill material can be used where high sound attenuation performance is required. The shelves' transverse cross section can include a mechanical key along the shelf top or/and bottom faces. When the shelves are placed on top of one another, the keys interlock the shelves in place.

The green wall shelves can consist of one unit or a plurality of units. For example, in FIG. 15a the wall shown is composed of a base shelf, seven plant shelves and a header shelf. Other green wall embodiments can employ one type of shelf or a combination of at least two types (not shown).

The green wall can stand alone acting as a fence or a screen, act as a single or double sided wall with the planter shelves' vertical member, solid or volumetric on one side or between plant grow panel/s, and/or be next to a new or existing wall.

The green wall shelves' assembly weight can be self-supported by transferring its load directly from the top shelf to the base shelf and from there, on to the surface below. It can be partially or fully supported by end posts, partially or fully supported by coupling to a wall, or a combination of the methods thereof.

In a common embodiment, the green wall assembly weight is transferred directly to the surface below. Its shelves are wedged inside the posts' flanges. In this embodiment the post webs stop lateral wall movement, while the flanges stop the wall's transverse movement across its longitudinal axis. In another embodiment the posts also abut the wall with the shelves coupled to the posts. In yet another embodiment, the shelves can be directly coupled to the wall.

The posts employed by the green wall system can be in the shape of the letter "I" having a web and a plurality of flanges oriented perpendicular to the web and the letter "O" having at least two parallel webs with an air gap between them, and a plurality of flanges enclosing the letter "O" and extending beyond at least one elongated side of the post. The "O" shaped post is referred herein as the chase post. Some or all the green wall's electrical and/or electromechanical components can be placed inside the post's structure. The chase post can have at least one access panel. The access panel can have a mechanical and/or an electronic tamper-proof lock.

The green wall system is scalable. Scalable components include the post types, the plant grow panels, the base shelf, the header shelf and the planter's vertical shelves. The system can be fabricated of metallic and/or non-metallic material. At least some of the green wall system can be fabricated of recyclable material.

The green wall transforms legacy roadway posts and plank wall systems into an all-in-one cultivation system wall that provides at least one of:
 a. Is structurally sound
 b. Provides sound attenuation
 c. Reduces urban ambient temperatures
 d. Filters the air from harmful chemicals
 e. Reduces carbon emissions
 f. Generates oxygen
 g. Softens the city's harsh landscape with green
 h. Provides above grade I.O.T. device infrastructure
 i. Consumes gray water
 j. Re-uses recycled material
 k. Is easily and quickly installed
 l. And most of all, is affordable worldwide FIGS. 15a and 15b show a partial elevation of the green wall and a horizontal longitudinal section of this elevation.

FIG. 15a shows a partial green wall elevation retained inside two posts' 2, 83 flanges 6. The green wall 3 is comprised of a base shelf 44, seven planter shelves 38 and one header shelf 48. The base shelf 44 can be a partially or fully enclosed beam through which power and/or fluid can flow inside pipe/conductors from one end to the other end of the shelf 44.

The header shelf 48 can also be partially or fully enclosed. Electrical and/or mechanical devices 4 can be placed inside the header shelf. Such devices can include a processor 56, a back-up power supply 10, a power inverter 53, a pump 11, a fluid tank 14 and a pull-down tarp 66. The header shelf can also have an access panel 89 from at least one side and/top (not shown).

This figure shows the header shelf 48 having fluid and electrical compartments. Recycled rainwater can be collected in the fluid tank 14 along with piped water. The rainwater enters the tank 14 from above percolating through a filtering 9 device blocking lights from entering the tank 14. Inside the tank a weep hole can have a breather 121 expel water when too much water enters the tank 14. The tank's water is conveyed through at least one opening in the chase post wall 84 to be distributed into the planter shelves 38 and/or be conveyed to at least one neighboring tank 14. In a different embodiment, the weep hole 121 can be coupled to a water level electronic sensor with a valve or a simple mechanical valve. Also, a filtering 9 device can be placed inside the sump as well as a UV light source (not shown).

Conductor/s' 13 power or power and data can be conveyed through the header shelf 48 electrical enclosure to and through at least one post 2, 83 and/or to at least one neighboring header post 48. The power can power at least one electronic or electromechanical device 4 inside or on the post/s 2, 83, inside the header shelf 48, inside the planter shelf 38, and inside the base shelf 44. Through the same or other conductor/s 13 power conveyed inside the header post can power at least one device on the exterior of the aforementioned posts 2, 83 and shelf types 48, 38, 44.

The header shelf 48 exterior surfaces can be coupled to input and output devices including photovoltaic panel/s 52, a camera 34, a speaker 35, a microphone 62, an air quality sensor 60, a noise sensor 79, a barometric pressure sensor 82, a transceiver 61, a lighting device 27, a power generating turbine 52, a vibration sensor 37 and a temperature sensor 64.

The green wall 3 can also provide more traditional utility acting as a sound attenuation and/or a retaining wall. In this figure, the wall elevation shows two vertical partition bars 68 placed on each shelf. The partition bars are an architectural accessory serving a decorative purpose by visually breaking up the green walls' 3 linearity.

FIG. 15b shows a horizontal longitudinal section of the wall shown in FIG. 15a. The wall's planter shelf 38 and the coupled plant grow panel 45 in this figure are shown wedged inside posts 2, 83 at the ends of the planter shelf 38. One post shown is a chase post 83 and the other is a shelf retaining post 2.

The planter shelf 38 shows a volumetric wall enclosure with fill material coupled to the plant grow panel 45. In a different embodiment, this assembly can be double sided with the plant grow panels 45 also coupled to the other side of the planter shelf's volumetric wall. In both scenarios, the plant grow panel faces the exterior space 90 and the panel's plant root structure 85 faces the planter shelf wall 38.

The planter shelf is discussed in FIGS. 16a, b, c, d and e, 19a and b, 20a and b, 21a and b and 22a, b and c. The posts 2, 83 are discussed in FIGS. 17a, b, c and d, and 18a and b.

FIGS. 16a, b, c and d show several planter shelves' transverse sections. FIG. 16e shows a partial frontal elevation of a planter shelf 38.

FIG. 16a shows a transverse section of a single sided plant grow panel 45 planter shelf 38 with its vertical shelf wall 86 having enough strength to transfer the assembly's axial loads to the shelf below. An integral horizontal flange 117 is shown coupled to the vertical member. The flange 117 can be coupled to the bottom and/or the top or bottom of the planter shelf wall/s 86. Also shown is a plant grow panel 45 coupled to the shelf wall 86 with two parallel coupling strips 103 and reciprocating strips 104. The planter shelf's irrigation pipe 46 is shown coupled to the horizontal flange 117 bottom.

The planter shelf 38 top and/or bottom wall 86 can be mechanically keyed 95. Keying the shelves helps rapid installation, mitigates shelves' lateral movement, and gives the wall additional rigidity against lateral forces such as wind loads. The planter shelf wall 86 in this embodiment is shown with a solid core wall. In other embodiments, the wall 86 can have at least one volumetric enclosure (not shown).

FIG. 16*b* shows a transverse section of a double-sided plant grow panel 45 planter shelf 38 with its vertical shelf wall 86 providing the strength to transfer the assembly's axial loads to the shelf below. Integral horizontal flanges 117 are shown at opposite sides coupled to the vertical wall member 86. The flanges 117 can be coupled to the bottom and/or the top or bottom of the planter shelf wall/s 86. Also shown are plant grow panels 45 coupled to the shelf wall 86 with two parallel coupling strips 103 and reciprocating strips 104. The planter shelf's irrigation pipes 46 are shown coupled to the horizontal flanges 117 bottom.

The planter shelf 38 top and/or bottom wall 86 can be mechanically keyed 95. Keying the shelves helps rapid installation, mitigates shelves' lateral movement, and gives the wall additional rigidity against lateral forces such as wind loads. The planter shelf wall 86 in this embodiment is shown with a solid core wall. In other embodiments, the wall 86 can have at least one volumetric enclosure (not shown).

FIG. 16*c* shows a transverse section of a single sided plant grow panel 45 planter shelf 38 coupled to a volumetric wall 93. The volumetric wall 93 figure shows an integral horizontal flange 117 at the embodiment's bottom extending outwardly. The flange 117 can be at the bottom and/or top of the planter shelf 86 wall/s. Also shown is a plant grow panel 45 coupled to the shelf wall 86 with two parallel coupling strips 103 and reciprocating strips 104. The planter shelf's irrigation pipe 46 is shown coupled to the horizontal flange 117 bottom.

The top or top and bottom of the panel/wall can be mechanically keyed 95. Keying the shelves helps rapid installation, mitigates shelf lateral movement, and gives the wall additional rigidity against lateral forces such as wind loads.

The volumetric wall 93 thickness may vary. Fluid 100 or granular material 94 can be placed inside the wall. The fluid 100 can be stored and used by the green wall 3 plants. Granular material 94 can be used to reduce sound transmission. The wall panels can have at least one inlet/outlet port 33 to fill and/or empty the wall panel enclosure content (not shown). Tensile cables 18 embedded in the panel's wall can provide resistance against shelf deflection (not shown).

FIG. 16*d* shows a transverse section of a double-sided plant grow panel 45 planter shelf 38 coupled to a volumetric wall 93. The volumetric wall 93 figure shows integral horizontal flanges 117 at the embodiment's bottom extending outwardly in the opposite direction from the volumetric wall 93. The flanges 117 can be at the bottom and/or top of the planter shelf 86 wall/s. Also shown are plant grow panels 45 coupled to the shelf wall 86 with two parallel coupling strips 103 and reciprocating strips 104. The planter shelf's irrigation pipe 46 are shown coupled to the horizontal flanges' 117 bottom.

The top or top and bottom of the panel/wall can be mechanically keyed 95. Keying the shelves helps rapid installation, mitigates shelf lateral movement, and gives the wall additional rigidity against lateral forces such as wind loads.

The volumetric wall 93 thickness may vary. Fluid 100 or granular material 94 can be placed inside the wall. The fluid 100 can be stored and used by the green wall 3 plants. Granular material 94 can be used to reduce sound transmission. This figure shows the volumetric wall 86 filled with sound attenuating material 101. The wall panels can have at least one inlet/outlet port 33 to fill and/or empty the wall panel enclosure content (not shown). Tensile cables 18 embedded in the panel's wall can provide resistance against shelf deflection (not shown).

FIG. 16*e* shows a partial frontal elevation of a planter shelf 38. Not shown is the plant grow panel 45 coupled to the shelf's vertical wall/s 102. In this figure, the shelf vertical wall can be solid or volumetric. A portion of the irrigation pipe 46 is shown below the horizontal flange 117 retained by a pipe fastening device 127. Two coupling strips 103 are shown along the shelf's vertical wall. These strips coupled to corresponding strips 104 at the root side of the plant grow panel 45 facilitate quick and secured connectivity to the planter's shelf wall 102.

The plant grow panel 45 employing the coupling strips 103 can be easily removed from the planter shelf wall 102. These "hook-and-loop" type coupling strips are durable, weather resistant and can be fabricated of recycled material. Other methods that can be used to secure the plant grow panel 45 to the planter's shelf 38 are spikes 105 mounted on the inner side of the shelf's wall 102 facing toward the plant grow panel's 45 root side. In another embodiment (not shown) the plant grow panel's 45 top surface can have fastening fittings to mount the panel to the above flange 6 or 6'. The mounting devices can include bolts 19 and/or straps 108, and the flange 6 or 6' can have bores 17 to enable such coupling.

Figure 17A:
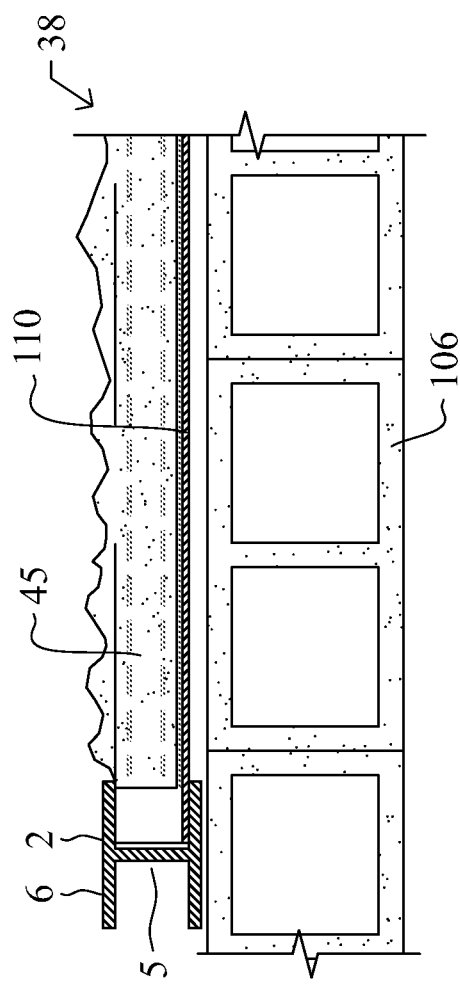
FIG. 17A is a partial top horizontal section view of a single grow sided planter shelf, according to an embodiment.

FIGS. 17*a* and *b* show partial top horizontal longitudinal sections of a single- and double-sided free-standing planter shelf 38. FIGS. 17*c* and *d* show partial top longitudinal horizontal sections of a single sided planter shelf 38 abutting external walls 106. In FIG. 17*c*, the shelf embodiment is wedged inside post flanges 2. In FIG. 17*d*, the planter shelf is directly coupled to the wall 106.

FIG. 17*a* shows a partial top horizontal section of a single grow sided planter shelf's end 107 with its plant grow panel 45 wedged inside post 2 flanges 6. The post and the shelf fabrication materials can be stable against thermal expansion having minimal clearance between the planter shelf 38 and the posts' flanges 6 or flanges 6 and the posts' web 5. The posts, the shelves and/or the plant grow panels can be coated and/or fabricated of fire-retardant material. This embodiment shows a volumetric wall 93 with the width of the wall extending from the exterior surface face to approximately the transverse section mid-point of the post's web 5.

In this embodiment, a row of spikes 105 is shown at the interior face of the shelf wall 102. The use of spikes 105 is one of several methods to secure the plant's grow panel 45 to the planter's shelf 38.

In this embodiment, the planter shelves 38 rest on one another wedged between the opposing posts flanges 6. In other embodiments (not shown), the shelf/s can be coupled to the post/s 2, 83. The header shelf 48 is commonly coupled to at least one of the posts 2, 83 forming a structural frame consisting of two posts 2, 83, or 2 and 83 and the header shelf 48. This frame prevents up-lift action of the base shelf 44 and/or the planter shelves 38. The frame can relieve lateral and up-lift forces.

Figure 17B:
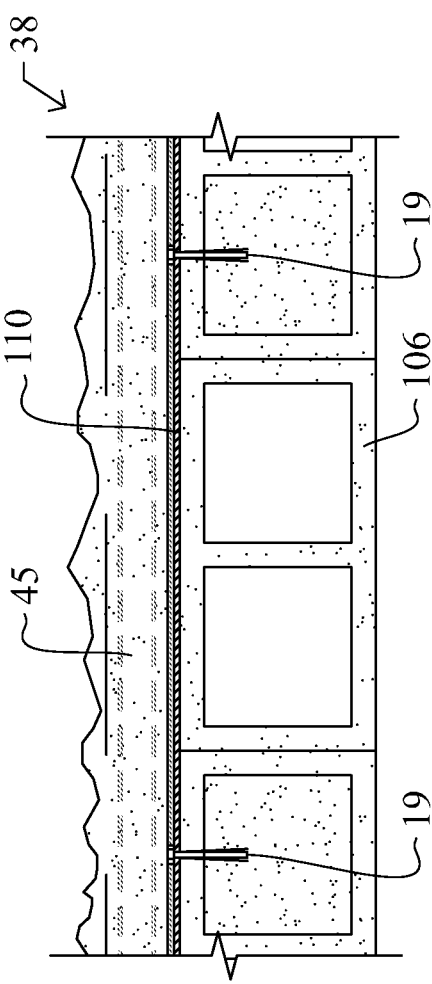
FIG. 17B is a partial top horizontal section of a shelf with two plant grow panels, according to an embodiment.
Figure 17C:
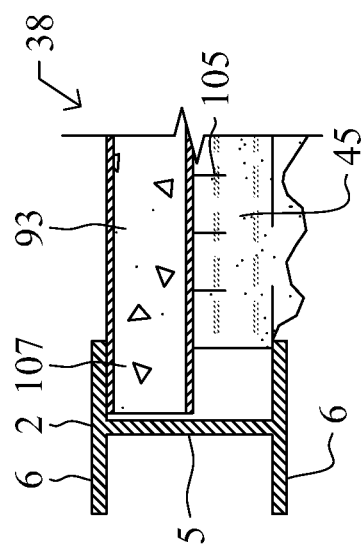
FIG. 17C is a partial top longitudinal horizontal section view of a single sided planter shelf abutting a masonry wall, according to an embodiment.
Figure 17D:
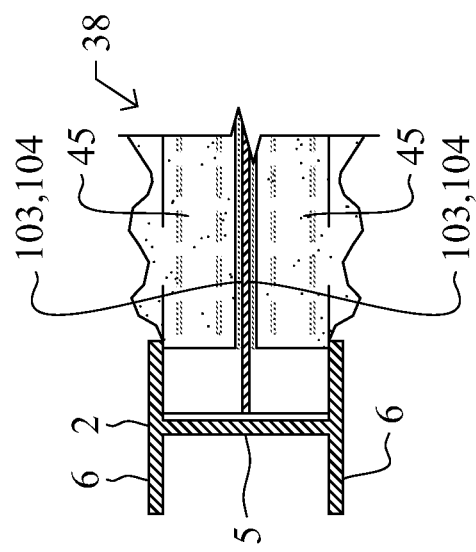
FIG. 17D is a partial top longitudinal horizontal section view of a single sided grow shelf abutting a masonry wall, according to an embodiment.

FIG. 17b shows a partial top horizontal section of the shelf's end 107 with two plant grow panels 45 located at the opposite sides of the planter shelf 38 partition wall 31. The post 2 and the shelf 38 fabrication materials can be stable against thermal expansion having minimal clearance between the planter shelf 38 and the posts' flanges 6 or flanges 6 and posts' web 5. The posts, the shelves and/or the plant grow panels can be coated and/or fabricated of fire-retardant material. This embodiment shows a partition wall 110 between the two plant grow panels 45 located approximately at the center of the posts' web 5 transverse section.

In this embodiment, continuous coupling strips 103 are shown at the interior faces of the partition wall 110. These strips contain a plurality of miniature hook like protrusions that when coupled with reciprocating strips 104 form a quick and durable bond. In this embodiment the reciprocating strips 104 are attached to the plant grow panel 45.

In this embodiment the planter shelves 38 rest on one another wedged between the opposing posts flanges 6. In other embodiments (not shown) the shelves 38 can be coupled to the post/s 2, 83. The header shelf 48 is commonly coupled to the post/s 2, 83 forming a frame. The frame consists of two posts 2, 83 or 2 & 83 and the header shelf 48 prevents up-lift action from the base shelf 44 and/or the planter shelves 38. The frame can relieve lateral and up-lift forces.

FIG. 17c shows a partial top longitudinal horizontal section of a single sided planter shelf 38 abutting a masonry wall 106. In this embodiment only plant grow shelves 38 with single side partition wall 110 are used. The planter shelves 38 are wedged within the post flanges 6 with the weight of the planter shelves 38 and/or the base shelf 44 transferring from the top planter shelf 38 to the bottom shelf.

The header shelf 48 weight can also transfer to shelves below, assumed by the posts 2, 83, or assumed by the shelves 38 and posts 2, 83. The posts 2, 83 can be embedded below the surface, bolted to retaining receiving plate/s, coupled to the wall or a combination thereof.

Employing posts in proximity to an existing wall can partially or fully relieve the structural stresses on the wall, while changing the wall's architectural character and providing environmental utility while reducing the building's solar gain.

FIG. 17d shows a partial top longitudinal horizontal section of a single sided grow shelf 38 abutting a masonry wall 106. In this embodiment only planter shelves 38 are used. The planter shelves 38 are coupled directly to the masonry wall 106 with bolts 19 having the wall assume the weight of the planter shelves 38 assembly.

This embodiment's fluid, or fluid and power can be delivered through the wall, from above and/or below the wall exterior (not shown).

Employing the external wall 106 to carry the loads of the planter shelves 38 allows for spacing variability for the planter shelves 38. This variability can change the walls' architectural character while reducing the building's solar gain.

FIGS. 18a and b show partial horizontal sections of the chase post 83 with the green wall system 3 planter shelves 38 wedged inside the chase's flanges 6.

FIG. 18a shows a double-sided green wall 3 system with a sound attenuation wall 77 panel between the plant grow panels 45. The wall assembly is wedged within the chase post 83 flanges 6. The chase post 83 can have an access panel 89 from at least one exterior wall surface 84. The access panel 89 can be furnished with a lock 92. The lock can be mechanical, electronic, or a combination thereof (not shown).

At least one of the green wall's key mechanical or electronic and/or electromechanical devices 4 can be housed inside the chase. These components may include a processor 56, a back-up power supply 10, a power inverter 53, a pump 11, a filter 9, a fluid tank 14, a valve 111, and a fluid distribution manifold 12.

The chase post 83 exterior surfaces can be coupled to input and output devices including photovoltaic panels 52, a camera 34, a speaker 35, a microphone 62, an air quality sensor 60, a noise sensor 79, a barometric pressure sensor 82, a transceiver 61, a lighting device 27, a power generating turbine 112, a vibration sensor 37 and a temperature sensor 64. At least one of the chase post web walls 84 can have a plurality of bores 17 through which a plurality of fluid or fluid and power conductors 46, 13 can reach at least one planter shelf 38. These bores can be factory pre-drilled and/or field drilled. The bores 17 can retain quick connect couplers 113.

Figure 23:
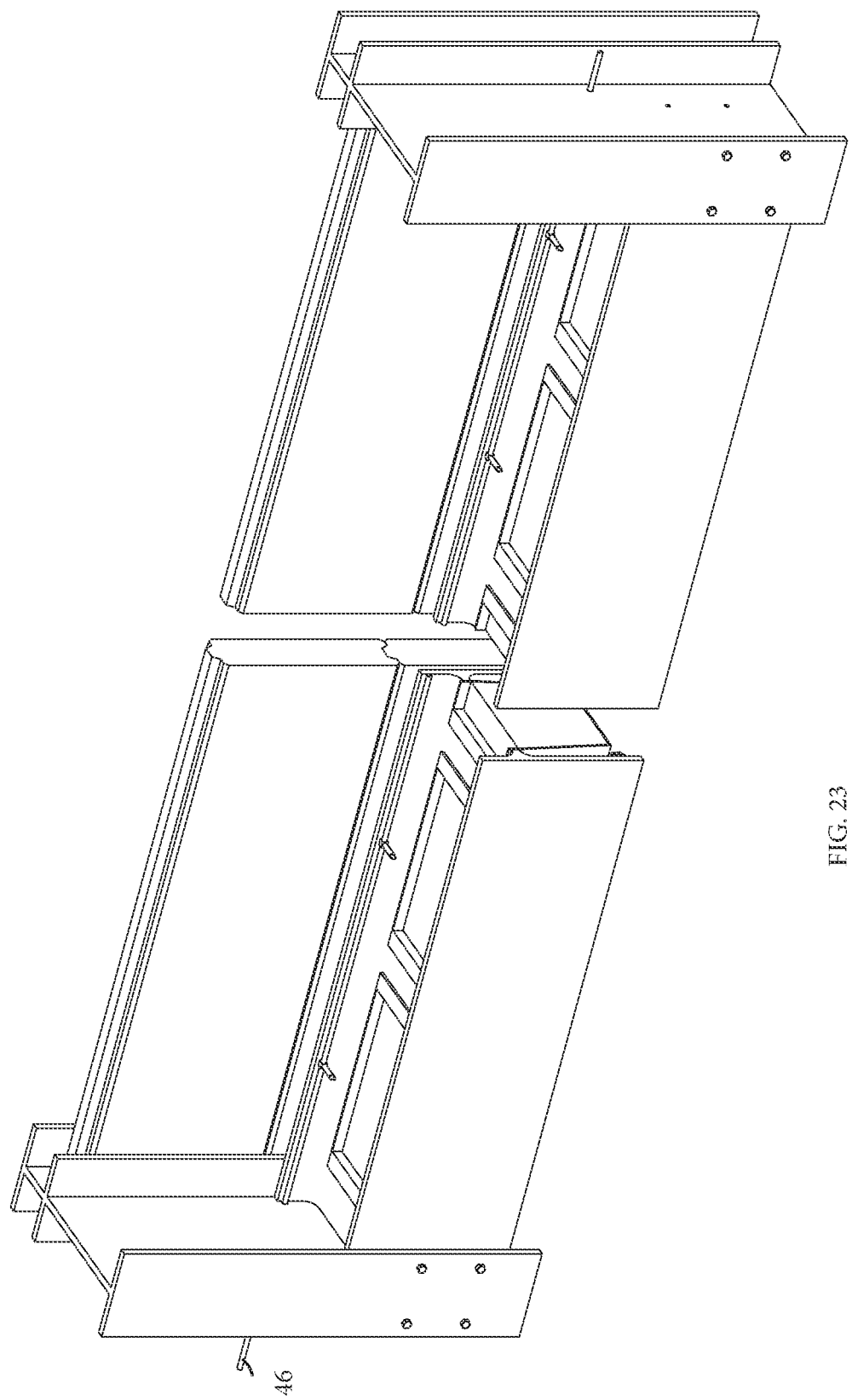
FIG. 23 shows the pipe 46 of FIG. 7A disposed through the bore 17 of FIG. 18A.

FIG. 23 shows the pipe 46 of FIG. 7A disposed through the bore 17 of FIG. 18A.

In one embodiment (not shown) a pre-configured electro or electromechanical system is delivered to a project site with irrigation pipe couplers 113 or irrigation couplers and electrical and receptacles 126 already configured to connect to the chase's web couplers/receptacles 113, 126. The embodiment's planter shelves 38 can then employ reciprocating connectors that quickly and securely couple to the post 2 and/or the chase post 83 couplers 113.

FIG. 18b shows a single-sided green wall system 3. The wall assembly is wedged within the chase post 83 flanges 6. The width of the green wall 3 abutting a neighboring external wall 106 can be narrow. The chase post 83 houses the green wall's 3 mechanical and/or electronic devices 4. The chase can expand as needed in a direction parallel to the neighboring wall 106.

The chase post 83 can have an access panel 89 from at least one exterior wall surface 84. The access panel 89 can be furnished with a lock 92. The lock can be mechanical, electronic or of a combination thereof (not shown). Some or all the green wall's key mechanical or mechanical and electronic components can be housed inside the chase. These components may include a processor 56, a back-up power supply 10, a power inverter 53, a pump 11, a filter 9, a fluid tank 14, a valve 111, and a fluid distribution manifold 12. The chase post 83 exterior surfaces can be coupled to input and output devices including photovoltaic panels 52, a camera 34, a speaker 35, a microphone 62, an air quality sensor 60, a noise sensor 79, a barometric pressure sensor 82, a transceiver 61, a lighting device 27, a power generating turbine 112, a vibration sensor 37, and a temperature sensor 64.

At least one of the chase post web walls 84 can have a plurality of bores 17 through which a plurality of fluid or fluid and power conductors 46, 13 can reach at least one planter shelf 38. These bores can be factory pre-drilled and/or field drilled. The bores 17 can retain quick connect couplers 113. In one embodiment (not shown) a pre-configured electro or electromechanical system is delivered to a project site with irrigation pipe couplings 113, or irrigation and electrical power receptacles 126 already connected to the post 2, 83 web couplers 113. The embodiment's planter shelves 38 can then employ reciprocating connectors that quickly and securely couple to the post 2, 83 and/or the chase post 83 couplers 113.

Figure 19B:
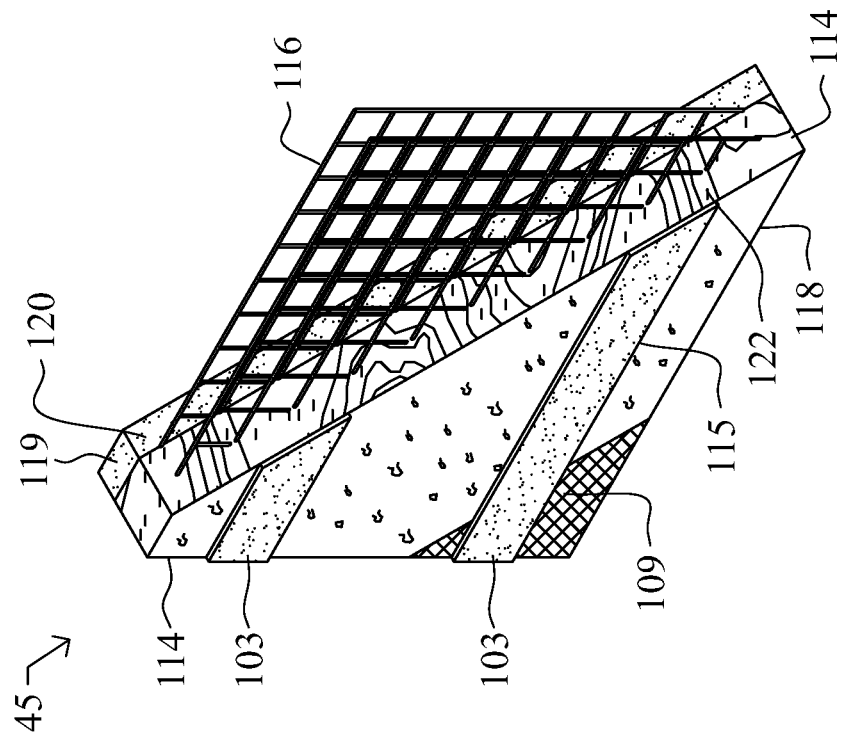
FIG. 19B is a back-side view of the panel described in FIG. 19a, according to an embodiment.
Figure 19A:
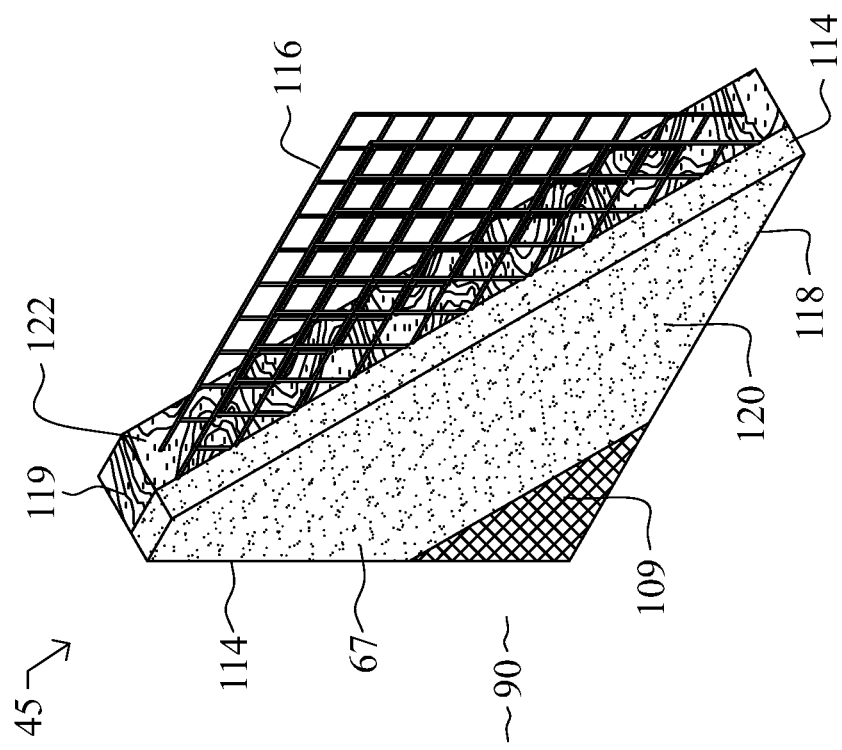
FIG. 19A is a perspective view of the vertical plant grow panel facing exterior open space, according to an embodiment.

FIGS. 19a and b show perspectives of the plant's grow shelf and the root sides of the plant grow panel.

FIG. 19a shows a perspective of the vertical plant grow panel 45 facing exterior open space 90. Plants grow on this side of the panel. Plant shoots can emerge through the vertical growth side of the panel surface growing randomly or in a pre-configured pattern. (The pattern configuration is discussed in more detail in FIG. 20). The panel's plants can grow in a nursery or onsite. The plant grow panel 45 can be seeded at a nursery and hauled to site when needed. Seeded panels can be rolled in a bale and cut to size onsite. The panel can also be produced as a hardened board/tile (not shown). The surface of the panel can be flush or employ a plurality of recesses. The recesses increase the surface area of the panel, thus in using small leaf plants, the effective $CO_2$ sequestering volume can increase.

The height of the panel is generally slightly less than the spacing between the planter shelf's 38 top and bottom horizontal flanges 117. The length of the plant grow panel 45 can be as long as needed but typically not exceeding the length of the planter shelf 38. The panel 45 grown in a nursery can be grown in large horizontal or vertical beds and cut to size by order. In some embodiments, typically seeded shelves can be hauled to site coupled to the shelf panel/wall 102. The coupled panels are removable. The vertical grow panel 45 plants have a shallow root 122 system that at a nursery may grow roots on a horizontal plane and then upon coupling to the green wall 3, can easily adapt to growing roots 122 on a vertical plane.

In some embodiments, exterior surfaces of the plant grow panel 45 can include an envelope 109. The envelope can be made of a thin profiled preferably bio-organic membrane that is porous to air and/or fluid. In another embodiment (not shown), only the root side of the panel 115 can employ a membrane. Such a membrane can be impervious to air and/or fluid. In yet another embodiment (not shown), no envelope 109 is employed, and the plant's bedding material 120 is bounded to maintain its solid form in wet conditions and under root proliferation stresses by an environmentally safe binder.

This figure shows the panel's plant grow side 67 in top perspective with some of its elements stripped back exposing the plant grow panel's 45 interior. The panel is composed of several layers of material. The layers are housed inside an enclosure envelope 109 having a top side 119, a bottom side 118, a panel root side 115, a plant grow side 67, and two opposing vertical end sides 114. The envelope 109 is made tightly woven fabric that permits air and fluid to penetrate the panel's 45 interior. The envelope's 109 two vertical side ends 114 can be sealed or can remain open until the panel 45 is ordered. Inside the envelope 109, at least one scaffolded 116 structure located between plant bedding material provides a structural anchor for the plants' root 122.

The plant bedding material 120 can use natural fiber like coconut shavings or fiber glass thin strands. In addition, nutrients and pest control additives can be mixed with the plant bedding material 120. At least one scaffolded 116 root grip anchor extends from the top side 119 to the bottom side 118 and from one end side 114 to the opposing end side 114 inside the envelope 109. On both sides of the scaffolded 116 plant bedding material 120 layers are spread evenly to form a substantially uniform thickness that provides ample rigidity to position the panel 45 vertically. In one embodiment (not shown), microscopic organisms and/or fungi can be distributed in the plant bedding material 120 to initiate and/or accelerate the panel's biodiversity ecosystem.

FIG. 19b shows the back side of the panel described in FIG. 19a. The back side of the panel is referred to herein as the panel's root side 115. This side typically couples to the planter shelf's 38 vertical partition/wall 110, 86. The envelope 109 membrane on this side of the wall can be impervious to fluid or fluid and air. In other embodiments (not shown), the plant grow panel 45 can be coupled to the shelf 38 from at least the top flange 6 or 6'. There are several methods to couple the plant grow panel 45 to the shelf's vertical wall 110, 86.

This figure shows two parallel horizontal strips 103. These strips' exterior surfaces are coupled to reciprocating strips 104. The reciprocating strips with miniaturized spires with hooks are coupled to the vertical shelf wall 110, 86. This provides a quick and easy installation and removal method for the plant grow panel 45. The installer of a grow panel 45 employing the strips, removes the protective cover from the plant's grow coupling strips 103 and pushes the panel 45 into position against the shelf's wall 110, 86. Upon removal, the installer grips one end and rips the panel 45 from the shelf's wall 110, 86. The panel 45 with its plant bedding material 120 can be flexed for horizontal motion. There are several other methods to couple the plant grow panel 38 to the planter shelf 45 discussed in other figures (not shown).

Figure 20B:
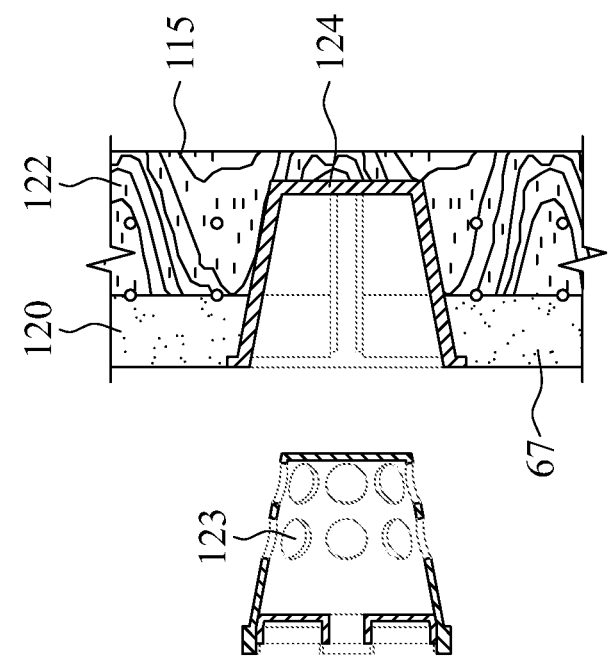
FIG. 20B is a partial horizontal section view across a casing retaining structure, according to an embodiment.
Figure 20A:
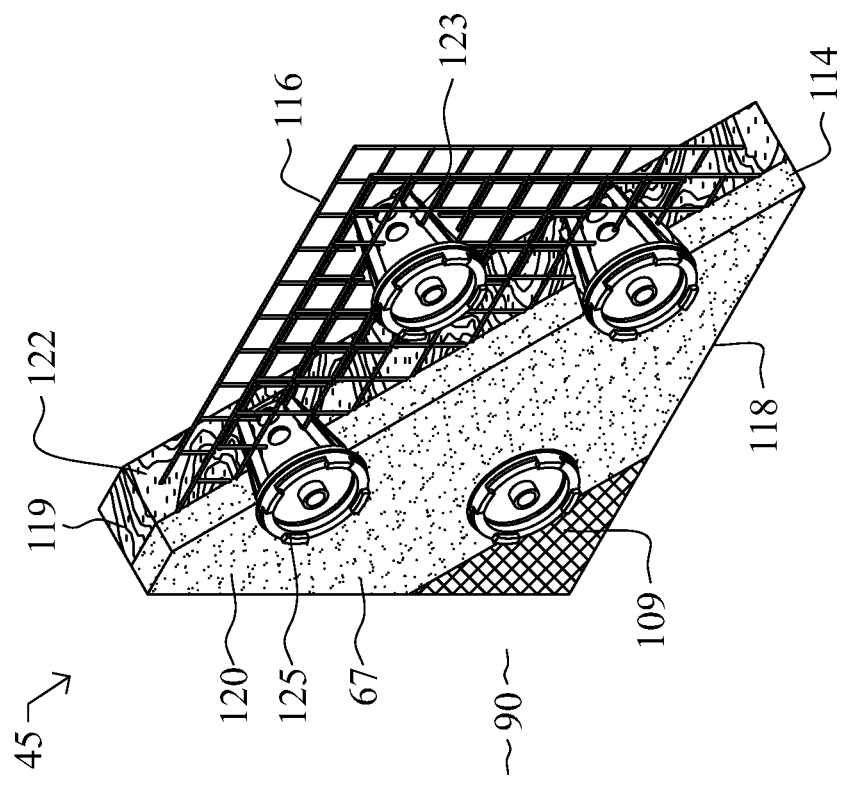
FIG. 20A is a perspective view of the vertical plant grow panel facing exterior open space, according to an embodiment.

FIGS. 20a and b show a partial perspective of the plant grow panel grow 45 side retaining a casing 125 and a horizontal section of the plant grow panel 45 showing an enlarged view of the casing 125 retaining structure.

FIG. 20a shows a perspective of the vertical plant grow panel 45 facing exterior open space 90. The plants grow on this side of the panel 67. Plant shoots can emerge throughout the vertical panel surface growing randomly or in a pre-configured pattern employing seeds and/or plant/s casings 125.

The plant panel 45 employing the casings 125 can be seeded and grown in a remote location and hauled to site when needed. Seeded panels not yet sprouted can be rolled in a bale and cut to size onsite. The casings 125 are inserted into a casing retaining structure 124 built into the plant grow panel 45. The panel can accommodate one or several rows of casings 125 with the casing retaining structure 124 spaced apart from one another as needed.

The casings 125 are detachable and can have sharp edges at the root egress openings 123 to sever the roots 122 and remove the casing 125 with the plant upon reaching the plant's end of life. Rotating a casing 125 with its sharp-edged root egress opening 123 against the fixed in place casing retainer structure 124, having reciprocating root egress openings, severs the roots 122 from the casing.

The height of the plant's grow panel 45 is typically slightly less than the spacing between a shelf's top and bottom flanges 6. The length of the panel can be as needed, typically not exceeding the length of the shelf 38. The panels with plants grown in a nursery can be cultivated in large horizontal or vertical beds and cut to size by order. In some embodiments, the shelf panel/wall 110, 86 coupled to plant grow panels 45 can be hauled to site with seeded casings 125 in place. The vertical grow panel plants have a shallow root 122 system that at the nursery may grow horizontal root 122 structures and then upon being mounted on a shelf 38 may adapt to grow roots 122 vertically.

This figure shows the panel's plant grow side 67 in top perspective with some of its elements stripped back exposing the plant's grow panel interior. The panel 45 is composed of materials arranged in layers. The layers are housed inside an enclosure envelope 109 having a top side 119, a bottom side 118, a panel root side 115, a plant grow side 67, and two opposing vertical end sides 114.

The envelope 109 is made of tightly woven fabric that permits air and fluid to penetrate the panel's 45 interior. The envelope's 109 two vertical side ends can be sealed or remain open until the panel 45 is ordered. Inside the envelope 109, at least one scaffolding 116 structure located between plant bedding material provides a structural anchor for the plant's root 122. The plant bedding material can use natural fiber like coconut shavings or fiber glass thin strands. In addition, nutrients and pest control additives can be mixed with the plant bedding material 120.

At least one scaffolding 116 root grip anchor extends from the top side 119 to the bottom side 118 and from one end side 114 to the opposing end side 114 inside the envelope 109. On both sides of the scaffolding 116 plant bedding material 120 layers are spread evenly to form a substantially uniform thickness that provides ample rigidity to position the panel 45 vertically. In one embodiment (not shown), microscopic organisms and/or fungi can be distributed in the plant bedding material 120 to initiate and/or accelerate the panel's biodiversity.

The figure also shows casings 125 and casings' retainer structures 124 horizontally embedded inside the plant's grow panel 45. The casing retainers 124 are fixed in position inside the panel 45 and can be coupled to the root retaining scaffolding 116 and/or to the exterior envelope 109. The plant panel 45 employing the casing 125 can have a prolonged use with plant casings 125 being replaced as needed or season by season.

FIG. 20b shows a partial horizontal section across a casing retaining structure 124 embedded in the vertical plant grow panel 125 and an extracted casing 125 in front of this panel.

The horizontally oriented casing 125 and the casing retaining structure 124 are shown aligned with the casing's opening facing the open exterior space 90. In a different embodiment, the orientation of the casing 125 and the casing retaining structure 124 can be angled. A casing 125 embedded with longitudinal axis orientation angled above the horizon can be used where the plant's root structure requires such an orientation for an optimal growth environment. The casing's 125 plant roots 122 grow through the casing's retainer 124 expanding into the grow panel interior space anchoring themselves to the root retaining scaffolding 116 structure.

The casing's root opening/s 123 can have sharp edges. Rotating the casing 125 inside the fixed casing retainer 124 severs the roots 122. The remaining plant roots become organic fertilizing material to the next generation of casings 125.

Figure 21A:
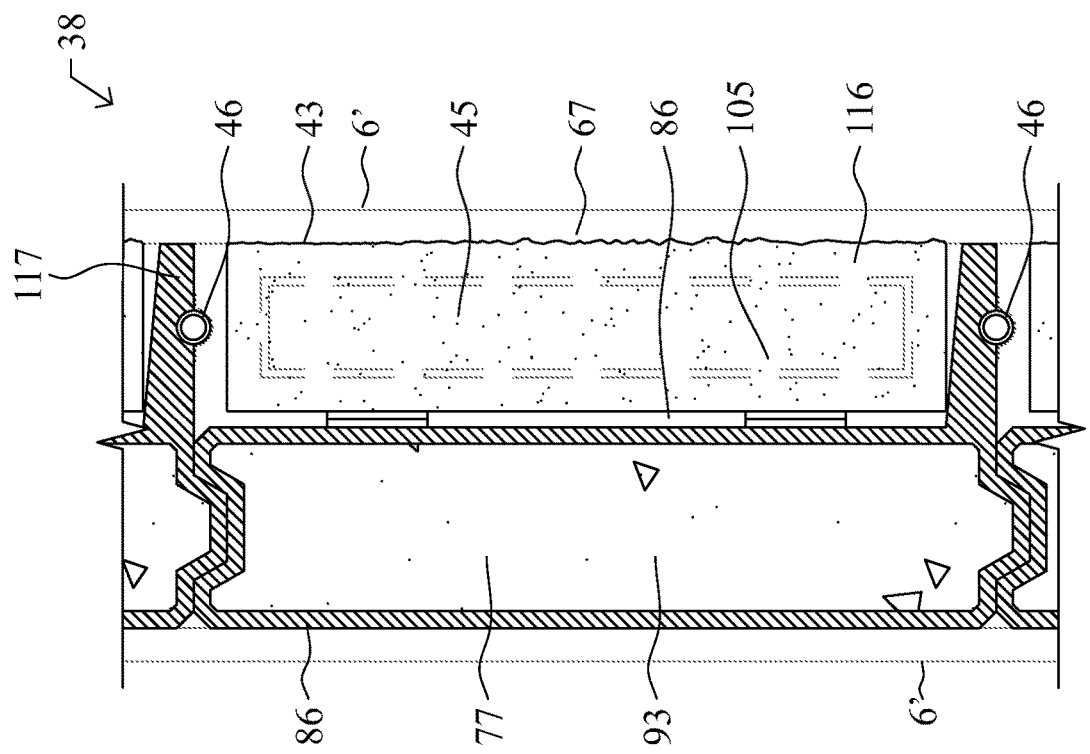
FIG. 21A is a partial transverse section view of a green wall, according to an embodiment.
Figure 21B:
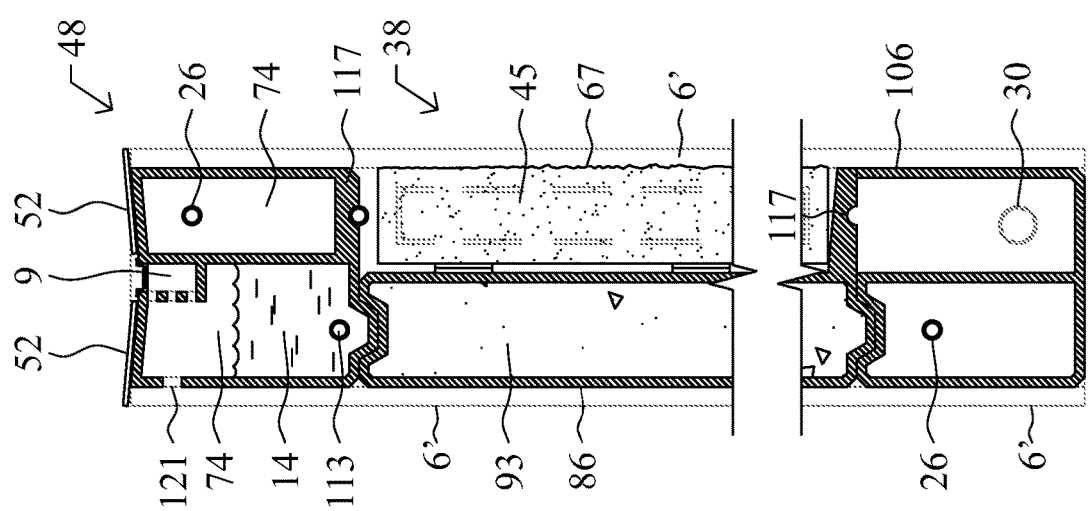
FIG. 21B is an enlarged transverse section view of the planter shelf, according to an embodiment.

FIGS. 21a and b show a transverse section of the green wall 3. FIG. 21a shows partial wall section including the header shelf 48, the planter shelf 38 and the base shelf 44. FIG. 21b shows an enlarged section of the planter shelf 45.

FIG. 21a shows a partial transverse section of a green wall 3 comprised of one base shelf 44, seven planter shelves 38, and one header shelf 48 restrained from uplift movement and restrained from lateral movement by the posts' 2, 83 flanges 6. The posts' flanges 6 are shown at both sides of the green wall 3. In another embodiment the planter shelf 38 can be substituted resting on the stem wall or directly on paved surfaces or the ground. In yet another embodiment, the header shelf 48 is not used. In such an application, the planter shelves 38 can be directly secured against uplift forces by direct or indirect coupling to the post.

The header shelf 48 shows an enclosure with a horizontal flange 117 similar to the planter shelf's 38 horizontal flange 117 at its bottom. Unlike the planter shelf 38, the flange 117 is the bottom wall of the header's enclosure 74 above. Electro or electromechanical devices 4 can be placed inside the header enclosure 74.

In this figure, the header's enclosure's 74 area is divided by a partition between an electrical or electromechanical device 4 enclosure and a fluid tank 14 enclosure. Power or power and data conductor/s 26 inside the electrical or electromechanical devices 4 enclosure can convey power or power and data to and/or from the chase post 83. In other embodiments, devices inside the header shelf electric or electromechanical enclosure 74 can include a processor 56, a back-up power supply 10, a power inverter 53, a pump 11, a filter 9, a fluid tank 14, a valve 111, and a fluid distribution manifold 12. The header shelf's 48 exterior surfaces can be coupled to input and output devices including photovoltaic panels 52, a camera 34, a speaker 35, a microphone 62, an air quality sensor 60, a noise sensor 79, a barometric pressure sensor 82, a transceiver 61, a lighting device 27, a power generating turbine 112, a vibration sensor 37 and a temperature sensor 64. Power or power and fluid can be conveyed from one segment of the green wall 3 to the next through the header shelf 48, employing quick connect couplers 113.

This figure shows the header shelf 48 having fluid and electrical compartments. Recycled rainwater can be collected in the fluid tank 14 along with piped water. The rainwater enters the tank 14 from above percolating through a filtering 9 device blocking lights from entering the tank 14. Inside the tank a weep hole can have a breather 121 expel water when too much water enters the tank 14. The tank's water is conveyed through at least one opening in the chase post wall 84 to be distributed into the planter shelves 38 and/or be conveyed to at least one neighboring tank 14. In a different embodiment, the weep hole 121 can be coupled to a water level electronic sensor with a valve or a simple mechanical valve. Also, a filtering 9 device can be placed inside the sump as well as a UV light source (not shown).

The planter shelf 38 is located below the header shelf 48 and above the base shelf 44. The planter shelf 38 can exclude the use of either the header shelf 48 and/or the base shelf 44.

The planter shelf's 38 top and bottom surfaces can be mechanically keyed 95 to form better structural coupling between the planter shelf 38 and other types of shelves or between two planter shelves and/or between one planter shelf and another type shelf. FIG. 21b. shows an enlarged section of the planter shelf 38 describing its elements in more detail.

The base shelf 44 rests on the ground, paved surface or on a stem wall. In this figure the base shelf is a volumetric enclosure showing two isolated compartments—an electrical/data and fluid. Power or power and data can flow across the electrical compartment from one post 2 to the next. A coupling 113 and/or a receptacle 126 at the post's web 5 facilitates quick electrical/data connectivity. The power/data can then power devices inside the chase 2, 83 and/or the header shelf 48. The power or power and data conductor 26 inside the electrical compartment can be elevated from the enclosure's bottom to protect from exposure to moisture. The fluid compartment is a conduit chase through which fluid piping 30 extends between at least two posts 2, 83. The pipe/s 30 then connect to at least one mechanical or electromechanical device inside a post and/or a header shelf 48.

FIG. 21b shows an enlarged transverse section of the planter shelf 38. The shelf elements include a vertical volumetric wall 93, the planter's horizontal flange 117, the plant grow panel 45, an irrigation pipe 46, and a mechanical key 95. The mechanical key 95 is typically located at the center of the top and/or bottom surfaces of the wall. The vertical shelf wall can transfer its weight from the shelf above to the shelf below spreading the weight along its keyed linear connection. In a different embodiment (not shown), the shelf's vertical wall 86 can be coupled directly to a wall structure.

Spikes 105 originating at the interior side of the vertical partition shelf wall 86, extend horizontally penetrating the interior space of the plant grow panel 45. The spikes 105 can have hook tips whose purpose is to retain the panel 45 in place. The horizontal flange 117 extending outwardly from the bottom of the shelf partition vertical wall 86 provides the following utility:
  a. Removes excess fluid by having its top surface slope toward the exterior.
  b. Can conceal power and/or data conductor at the bottom side of the flange.
  c. Can provide recesses for concealed or semi-concealed pipes and/or conductors.
  d. Provides a surface that counteracts rotational forces when the shelf is retained within post flanges.

The flange 117 can be monolithically formed coupled to the shelf's vertical partition or volumetric wall 110, 86. The assembly can be further secured against rotation with anti-rotation bolts inserted in the post's flanges 6 and/or brackets secured inside the flange opening.

The horizontal planter flange 117 can be monolithically formed coupled to the shelf's vertical partition or wall 86. The assembly can be further secured against rotation with anti-rotation bolts inserted in the post's flanges 6 and/or brackets secured inside the flanges' openings.

Power or power and data conductor/s 13 can be concealed at the bottom of the horizontal flange 117 (not shown). The conductor 13 can convey low voltage power and/or signal along the length of the shelf 38. The conductor can also convey power and/or data from one wall section to the next through a post 2, 83. In one embodiment, the conductor/s 13 can be coupled to light source 27 device/s illuminating the green wall 3 at night. Where cost of energy is low, illuminating the green wall 3 at night with the proper light spectrum band prolongs the plant photosynthesis day, further sequestering pollutants from the air. The conductor/s can also be coupled to the sensing, output, and/or communication devices 98.

The conductor/s 13 can be delivered to site already installed, or already installed and coupled to its devices. Once installed, the devices can be powered quickly by connecting the conductor/s to the factory pre-installed receptacle/s 126.

The irrigation pipe 46 extends the length of the planter shelf 38 and is positioned at the approximate transverse center of the horizontal flange's 117 bottom face. The flange 117 can have a recess to accommodate a portion or the entire pipe's 46 profile. Pipe retaining devices 127 can be mounted intermittingly to at least one flange 117 surface next to the pipe 46 keeping the pipe in place.

The pipe 46 has a plurality of openings 42 along its length distributing fluid evenly across the shelf's 38 length. The pipe 46 coupled to the underside of the horizontal flange 117 is located over the plant grow panel 45, with openings aligned at the approximate middle of the plant grow panel's 45 elongated embodiment. Fluid flowing inside the pipe 46 can be pressurized or flow under gravity. Fluid exiting the pipe 46 can reach the plant grow panel 45 in the form of a stream, drops and/or mist.

The pipe's openings 42 can retain at least one drip head, spray nozzle, and/or control pressure opening. When freezing weather conditions are anticipated, in one embodiment a remote pump (not shown) can evacuate the pipe's fluid. The fluid in the pipe 46 can be potable or gray water. The fluid can be fortified with plant nutrition and/or pest control additive/s. The pipe 46 can engage the couplings 113 at one or both ends and can be delivered coupled to the shelf with quick connect coupling/s ready to be engaged.

FIGS. 22a, b and c show in perspective views several methods for coupling the plant panels to the support shelf.

FIG. 22a shows a plurality of horizontal strips 104 coupled to the planter shelf's vertical wall 102 with the strip's surfaces populated by miniaturized spires with hooks. The strips 104 are adapted to couple to reciprocating strips 103 that are coupled to the root side 115 of the plant grow panel. The strips' 103, 104 coupling locations can be alternately arranged between the planter shelf vertical wall 102 and the plant panel root side 115. These strips can be factory/nursery installed and the installer simply pushes the plant grow panel into position. At the end of the plant panel's useful life, the panel can simply be ripped off the planter shelf 38. For clarity, this figure shows the plant grow panel in a diagrammatic form highlighting the reciprocating strips 103.

FIG. 22b shows a plurality of horizontal strips with spikes 105 coupled to the shelf's vertical wall 102. The spikes' 105 tips can include a hook like structure. The spikes are configured to penetrate the plant grow panel 45 envelope 109 at the panel's root side 115, coupling the planter shelf 38 to the plant grow panel 45.

The spikes' 105 height can slightly exceed the distance between the envelope 109 at the panel's root side and the anchoring root scaffolding 116 providing ample surface area for the spikes' 105 hooks to engage. The spikes 105 can be factory or field installed and the installer simply pushes the plant grow panel 45 into position. At the end of the plant panel's useful life, the panel 45 can be simply be ripped off the planter shelf 38.

FIG. 22c shows an incremental fastening structure 128 at the top side 119 of the plant grow panel 45. The structure is coupled to the plant grow panel envelope 109 and can have a threaded bore 117, a threaded rod 129, and/or a fastener/connector 130. A plurality of reciprocating bores 17 in the horizontal flange 117 can secure the grow panel 45 in place by employing through bolts, nuts, and/or straps 108. These mounting methods are more common in locations where vandalism is more likely to occur. These mounting methods are factory pre-configured requiring special provisions for both the plant grow panel 45 and the planter shelf's horizontal flange 117. When the plant grow panels arrive separately onsite, the installer pushes the plant grow panel against the shelf's wall, and then one by one he/she couples the mounting device to the flange.

At the end of the plant panel's useful life, the panel's fastening devices 130 can be removed. For clarity, this figure shows the plant grow panel in a diagrammatic form highlighting the intermittent anchoring threaded bores and the reciprocating bores 17 and bolts 16 at the shelf's horizontal flange 117.

CONCLUSION

The vertical green wall innovation expands on the traditional wall utility in urban settings, mitigating man-made ecological damage to our environment. In so doing, the vertical green wall enhances human urban habitats, and lessens the built-in psychological and physiological stresses that the urban environment induces. The attributes of the green wall include:

a. Sequestering carbon dioxide and harmful gases and particulates from the air while increasing the air's oxygen content
b. Reducing urban noise levels
c. Reducing the thermal mass of the city
d. Making use of gray water
e. Making use of recycled material for the cultivation system structure
f. Enhancing the appearance of the urban environment
g. Enhancing urban dwellers' well-being
h. Reducing urban vertical surface area targeted by graffiti
i. Providing a platform for mounting devices that serve the public
j. Reducing energy costs
k. Expanding urban biodiversity Traditional urban walls serve as retaining and sound attenuation walls. As cities grow and renovate, there is an ongoing demand for such walls. The traditional wall requires skilled labor, employs environmentally harmful material, and can be rather costly. By contrast, the green wall provides a quick installation method, requires minimally skilled labor, is environmentally safe, is architecturally friendly, and possibly a less costly alternative solution for most above grade urban walls.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A multi-tiered vertical plant cultivation apparatus comprising:
   a first flanged post that is vertically oriented and has a web between flanges, the web includes a through-opening, the through-opening being sized to allow irrigation fluid to flow therethrough;
   a second flanged post that is vertically oriented and separated from the first flange post by a predetermined distance;
   a first planter shelf that extends between the first flanged post and the second flanged post, and is mechanically secured to prevent upward mobility;
   a second planter shelf that extends between the first flanged post and the second flanged post, and is mechanically keyed to the first planter shelf;
   a plant grow panel that is vertically oriented and coupled to the first planter shelf and is configured to grow plants on at least one vertical plane thereof toward a space exterior to the plant grow panel; and
   an irrigation pipe that is positioned to receive the irrigation fluid via the through-opening, the irrigation pipe extends across at least a majority of a span of the first planter shelf, the pipe having a hollow interior portion sized to carry fluid from one opposite side of the web to at least the majority of the span of the first planter shelf, the pipe includes openings to permit emission of fluid carried by the pipe to irrigate the plants that grow on the plant grow panel.

2. The plant cultivation apparatus of claim 1, wherein the web of the first flanged post is coupled to at least two flanges that are set apart from one another by the web, the first flanged post being a chase post.

3. The plant cultivation apparatus of claim 1, further comprising:
   an electrical conductor that extends through the through-opening in the web.

4. The plant cultivation apparatus of claim 3, wherein the pipe and/or the electrical conductor couples to a top or bottom surface of a flange of the first planter shelf.

5. The plant cultivation apparatus of claim 1, further comprising an end shelf configured to serve as at least one of a water collection device, a fluid retention enclosure, or a water distribution channel to irrigate the plants, the end shelf being a header shelf or a base shelf.

6. The plant cultivation apparatus of claim 1. wherein at least a portion of the plant cultivation apparatus comprising a flame-retardant material.

7. The plant cultivation apparatus of claim 1, further comprising images that are visibly positioned on an exterior of the plant cultivation apparatus.

8. The plant cultivation apparatus of claim 1, wherein the first flanged post, the second flanged post. the first planter shelf, the second planter shelf. and at least one of a header shelf and a base shelf each at least partially comprising a non-metallic material.

9. The plant cultivation apparatus of claim 1, further comprising an electrical device, an electromechanical device, or both the electrical device and electromechanical device that are coupled to the plant cultivation apparatus.

10. The plant cultivation apparatus of claim 1, further comprising a power generating device that is coupled to the plant cultivation apparatus.

11. The plant cultivation apparatus of claim 1, further comprising at least one of a sensor, or a communication device is coupled to the plant cultivation apparatus.

12. The plant cultivation apparatus of claim 1, further comprising an enclosure panel, wherein
   the first flange post is a chase post, and
   the enclosure panel is perpendicularly coupled to the chase post so as to form an enclosure that houses at least one of an electronic device an electromechanical device related to an operation of the plant cultivation apparatus or that is functionality non-related to the operation of the plant cultivation apparatus.

* * * * *